(12) United States Patent
Ashley et al.

(10) Patent No.: US 6,352,206 B1
(45) Date of Patent: Mar. 5, 2002

(54) CREDIT CARD EMBOSSING SYSTEM, EMBOSSER AND INDENT IMPRINTER, AND METHOD OF OPERATION

(75) Inventors: Keith R. Ashley, Clark; David K. Giegerich, Westwood; Igor Pankiw, Hillside; Philip M. Roth, Budd Lake, all of NJ (US)

(73) Assignee: Card Technology Corporation, Paramus, NJ (US)

( * ) Notice: Subject to any disclaimer, the term of this patent is extended or adjusted under 35 U.S.C. 154(b) by 0 days.

(21) Appl. No.: 09/271,160

(22) Filed: Mar. 17, 1999

(51) Int. Cl.⁷ .............................................. G06K 13/00
(52) U.S. Cl. ........................ 235/475; 235/479; 235/477
(58) Field of Search .................... 235/475, 380, 235/449, 451, 476, 477, 498, 479, 483, 484, 485, 486, 492, 493

(56) References Cited

U.S. PATENT DOCUMENTS

| | | | |
|---|---|---|---|
| 3,116,820 A | 1/1964 | Owen | 197/6.7 |
| 3,602,137 A | 8/1971 | Fort Camp | 101/29 |
| 3,620,344 A | 11/1971 | Deutsch | 197/6.7 |
| 4,271,012 A * | 6/1981 | LaManna et al. | 209/653 |
| 4,343,837 A | 8/1982 | DeLorenzo | 427/275 |
| 4,504,841 A * | 3/1985 | Vignerot et al. | 346/104 |
| 4,688,785 A | 8/1987 | Nubson et al. | 271/266 |
| 4,825,054 A * | 4/1989 | Rust et al. | 235/380 |
| 4,827,425 A * | 5/1989 | Linden | 364/478 |
| 4,851,651 A * | 7/1989 | Gaucher | 235/380 |
| 4,866,545 A * | 9/1989 | LaManna et al. | 360/53 |
| 4,969,760 A | 11/1990 | LaManna et al. | 400/134 |
| 5,070,781 A * | 12/1991 | Lundstrom et al. | 101/32 |
| 5,406,422 A * | 4/1995 | LaManna | 360/2 |
| 5,460,089 A | 10/1995 | Kennedy | 101/269 |
| 5,503,514 A | 4/1996 | LaManna et al. | 414/753 |
| 5,814,796 A | 9/1998 | Benson et al. | 235/375 |
| 5,837,991 A | 11/1998 | LaManna et al. | 235/475 |
| 6,106,624 A * | 8/2000 | Kazo et al. | 118/712 |

FOREIGN PATENT DOCUMENTS

| | | |
|---|---|---|
| FR | 2598003 | 10/1987 |
| JP | 5-293949 | * 11/1993 |

* cited by examiner

*Primary Examiner*—Michael G. Lee
*Assistant Examiner*—Diane I. Lee
(74) *Attorney, Agent, or Firm*—Antonelli, Terry, Stout & Kraus, LLP

(57) ABSTRACT

The invention is an embossing system, embosser and indent imprinter and method of operation thereof. The invention includes a plurality of stations (34, 36, 40, 42, 44 and 46) including an embossing station (38); a carriage (162) for holding an item (60) to be processed by the system at the plurality of stations including the embossing station; a carriage transport (180) which moves the carriage while holding the item to be processed along a plurality of spaced apart transport paths; and wherein at least one station is disposed on each of the plurality of transport paths and the carriage transport moves the carriage holding the item along the plurality of transport paths to each of the plurality of processing stations at which processing is performed on the item.

100 Claims, 31 Drawing Sheets

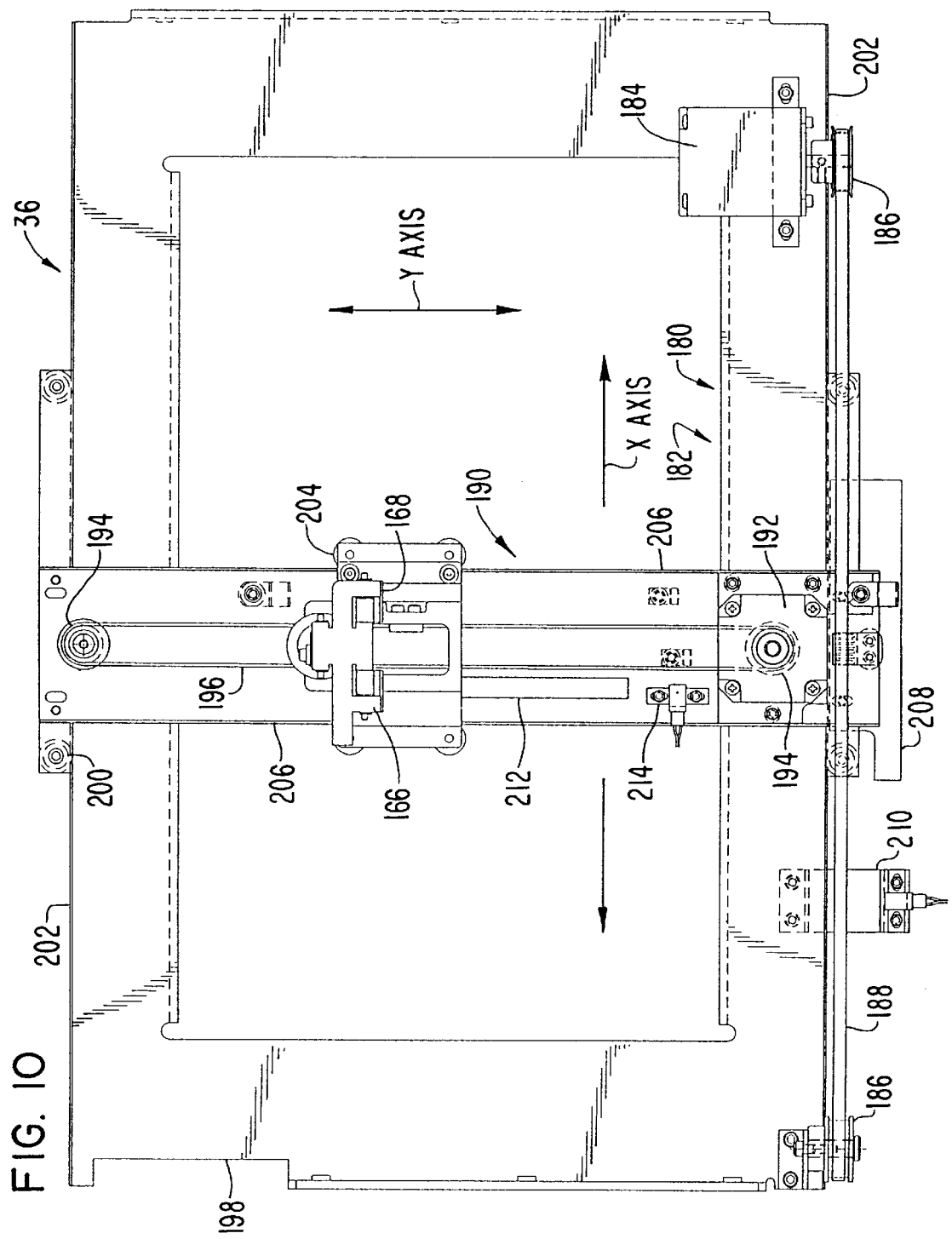

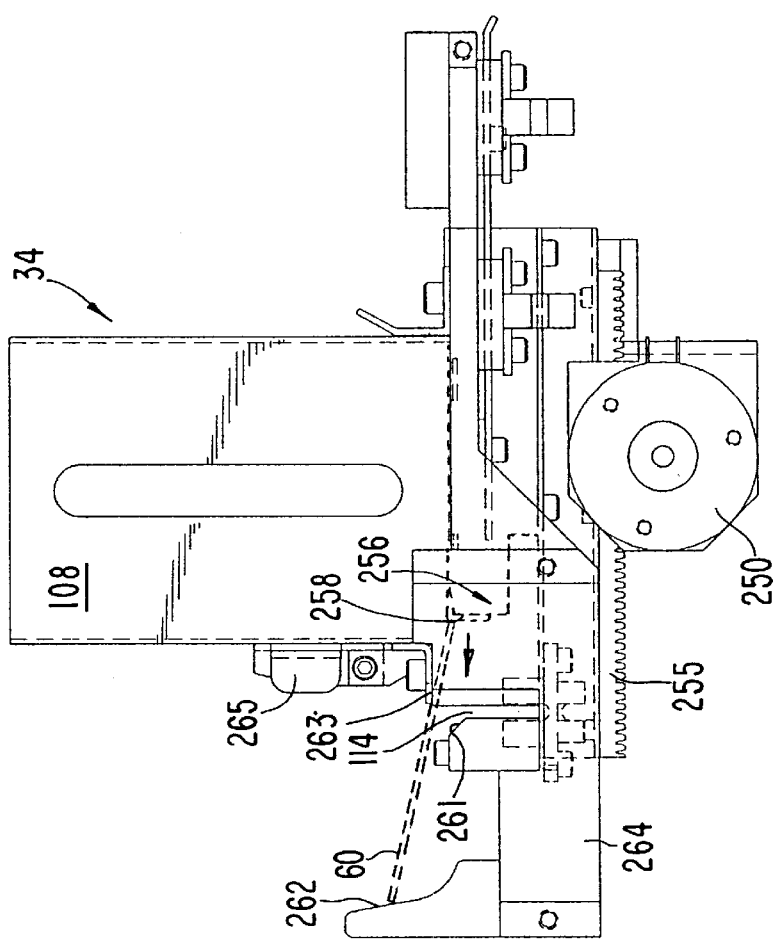
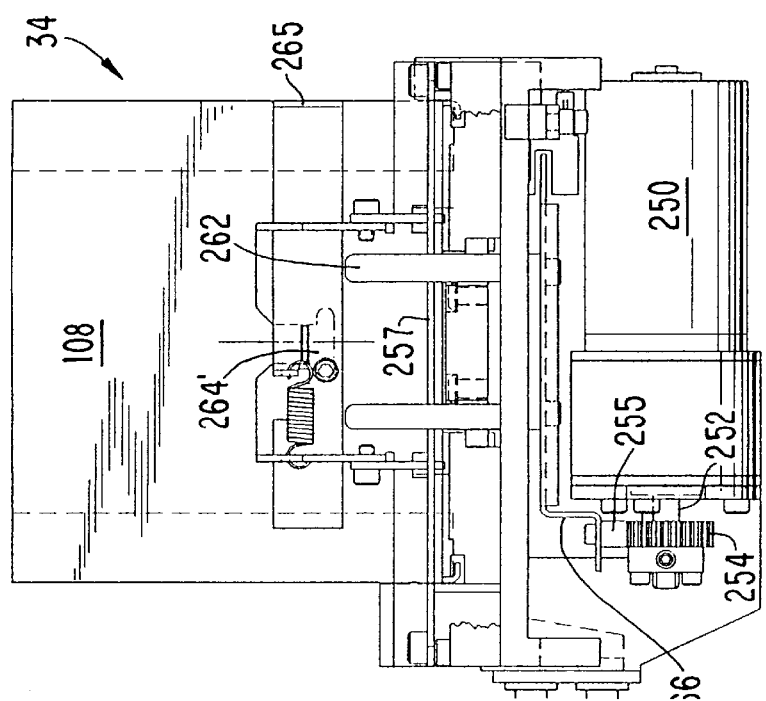

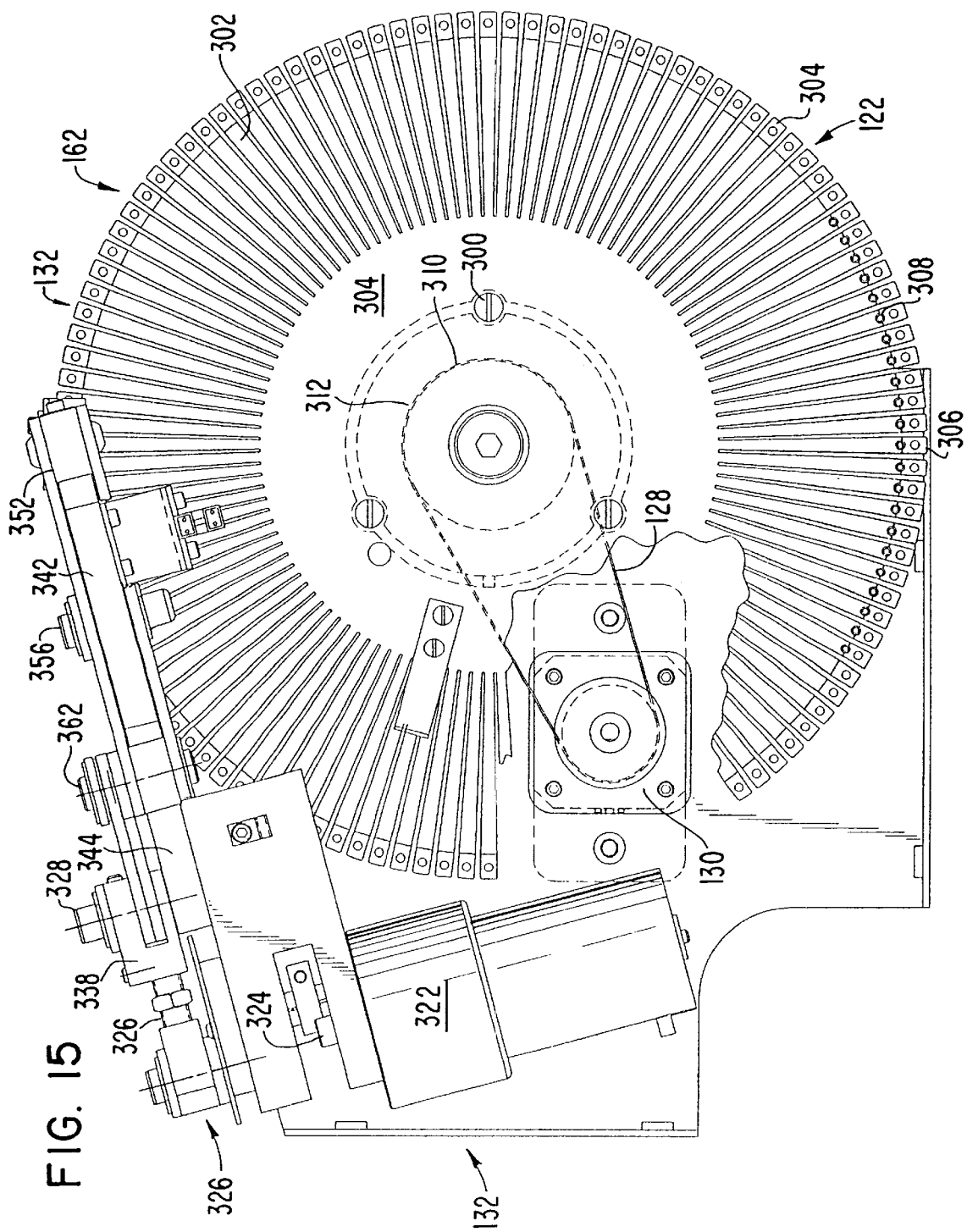

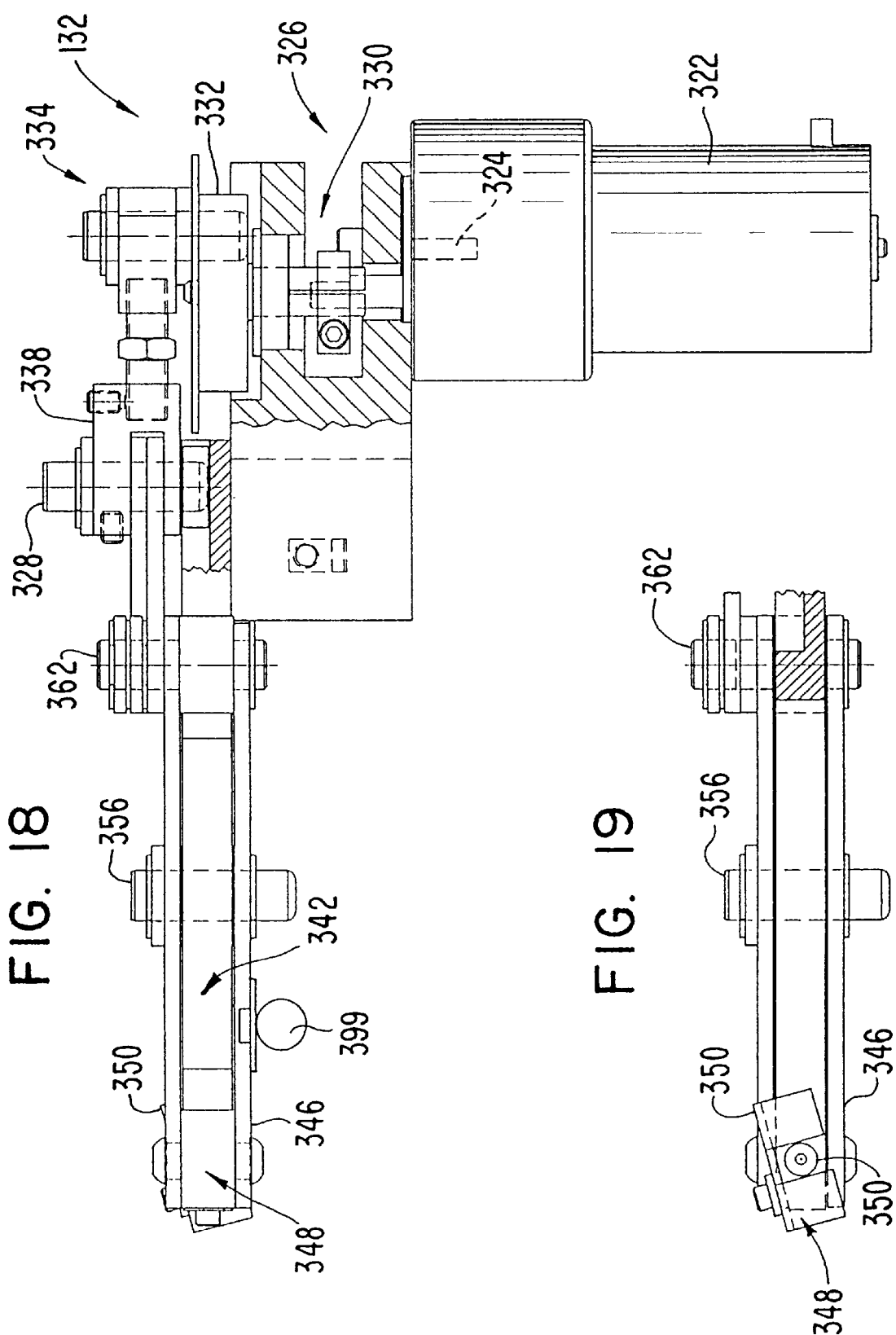

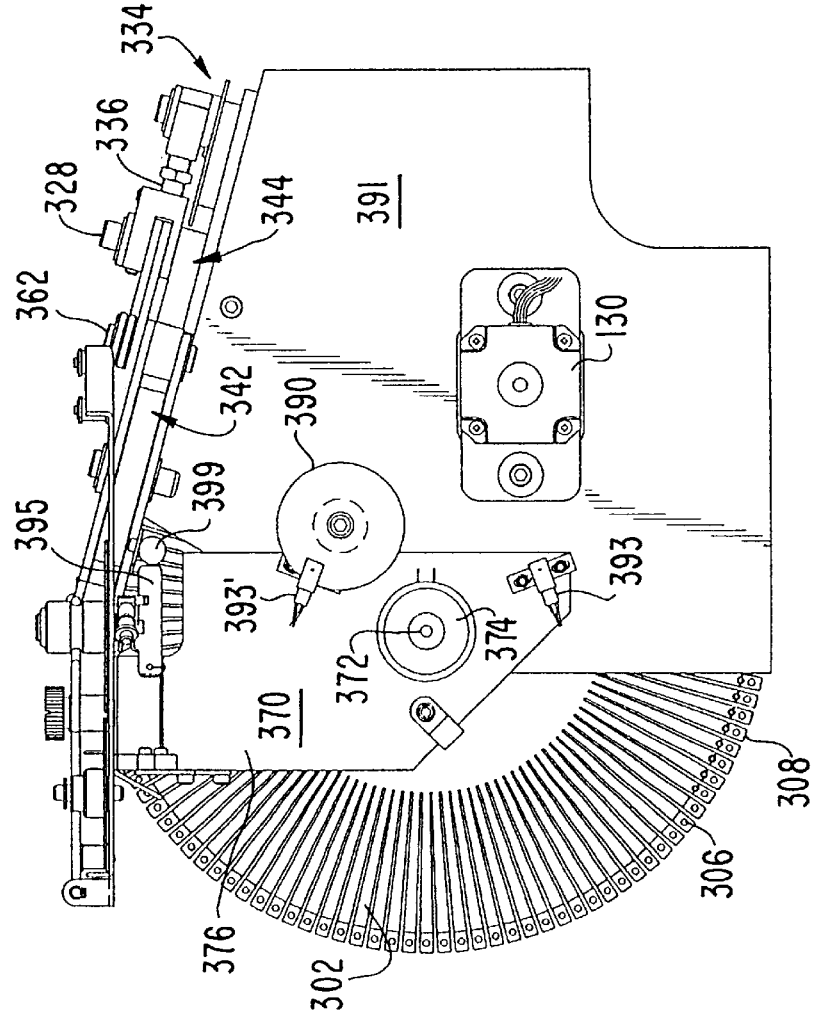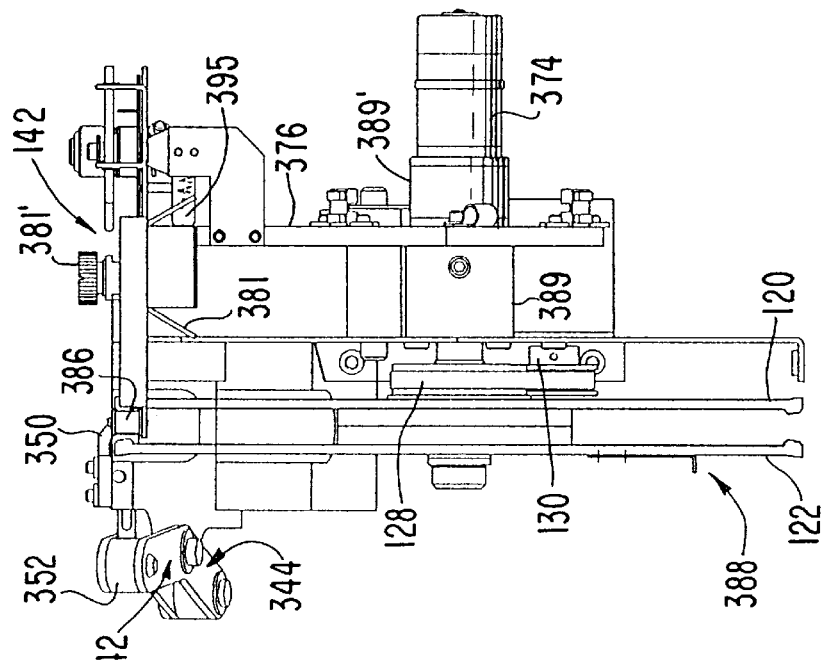

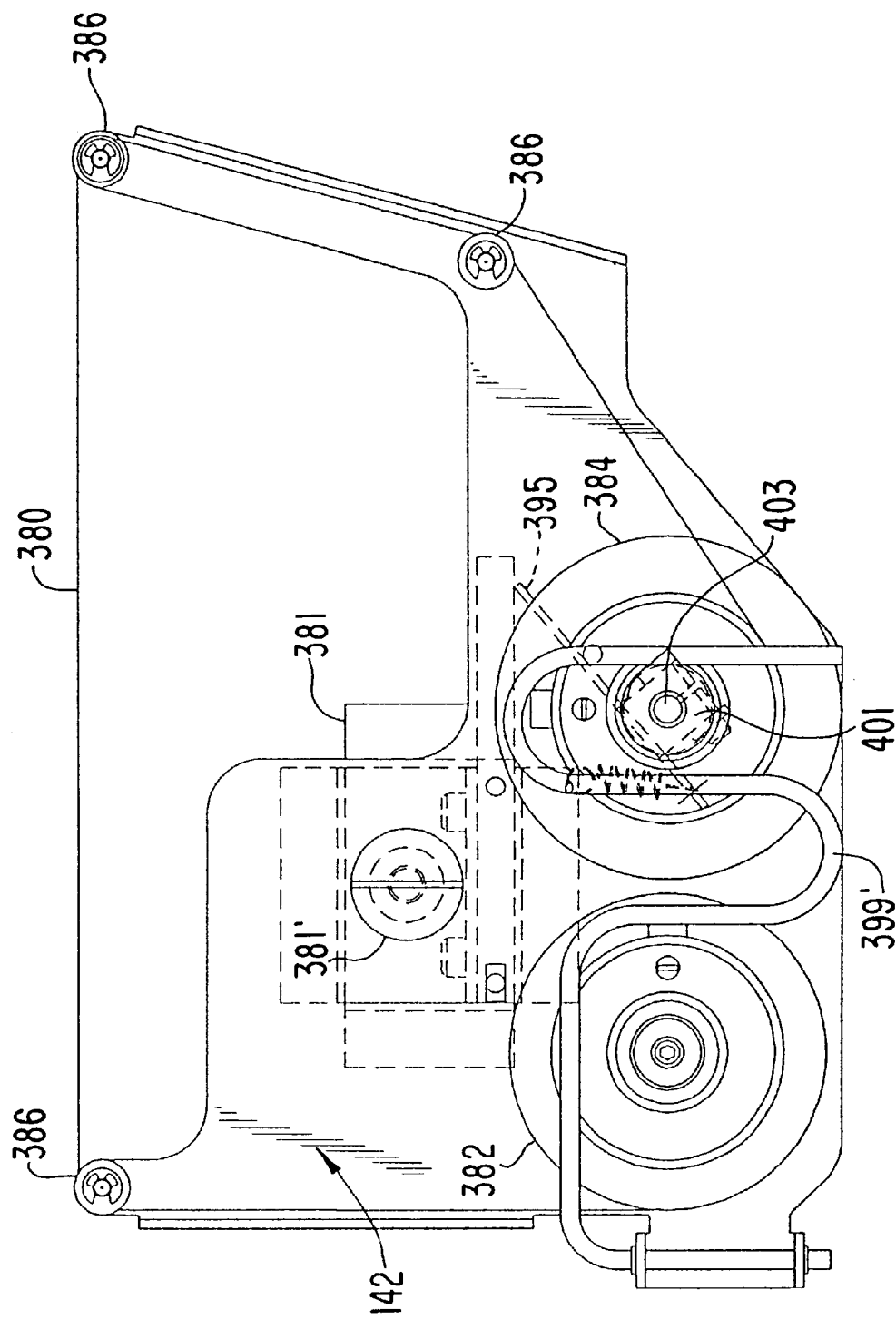

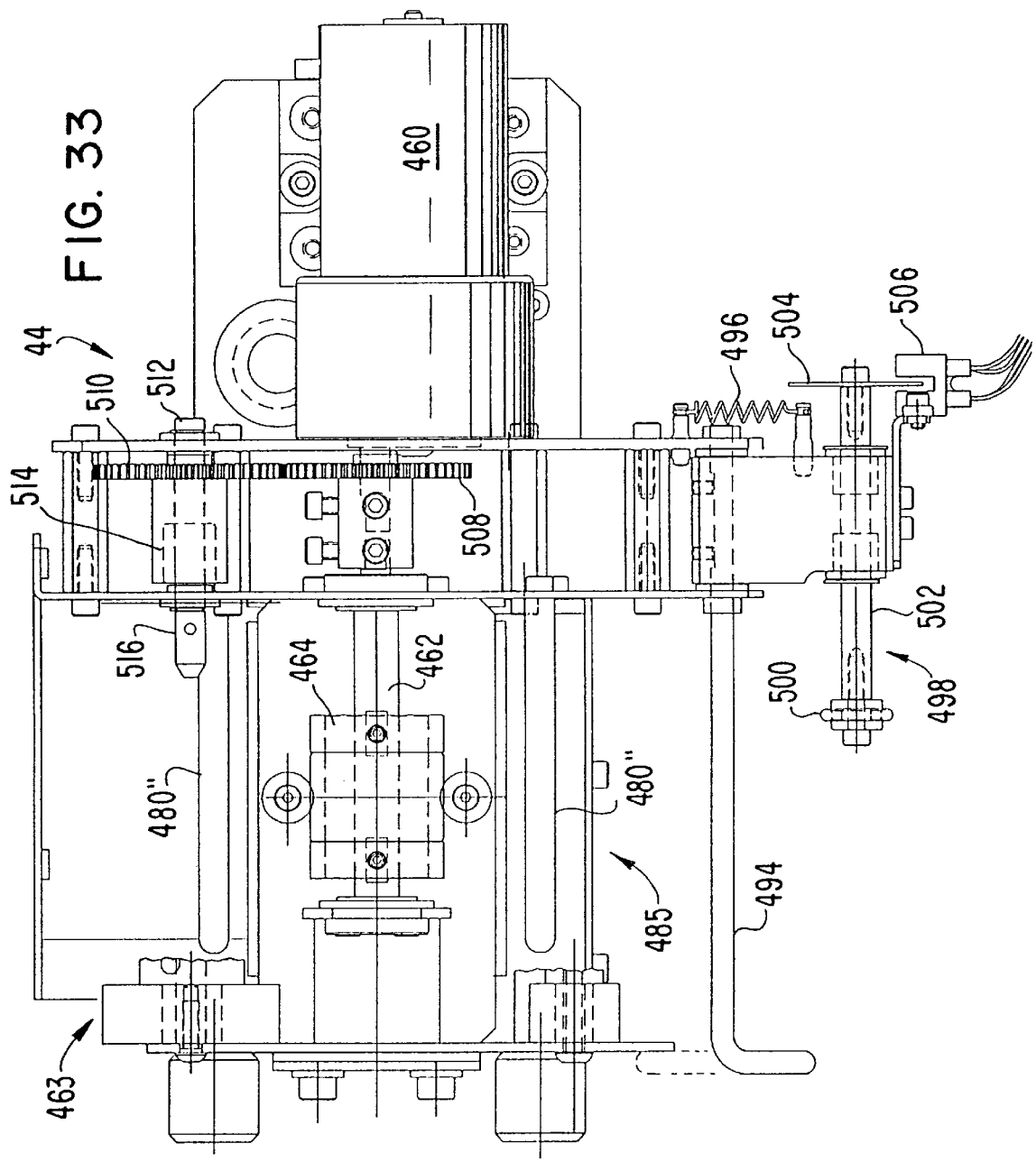

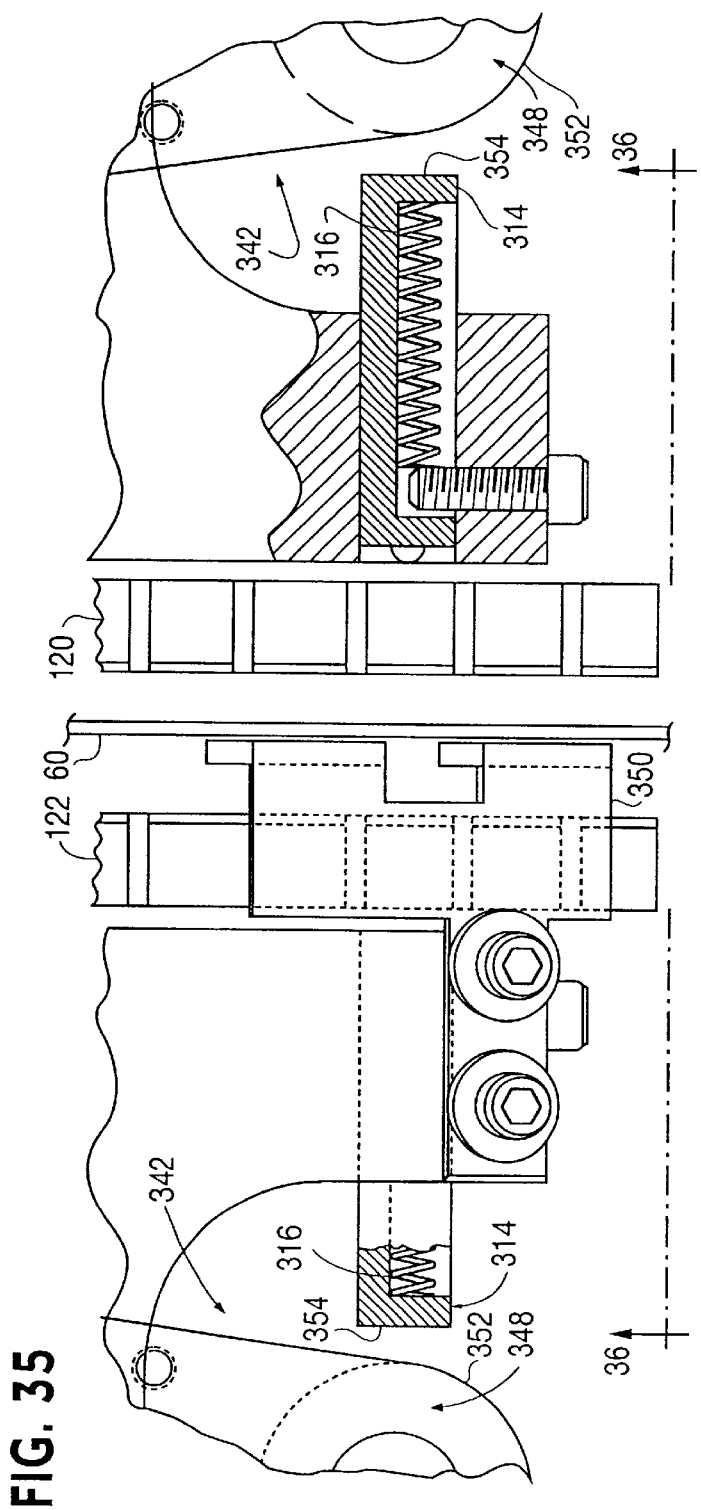
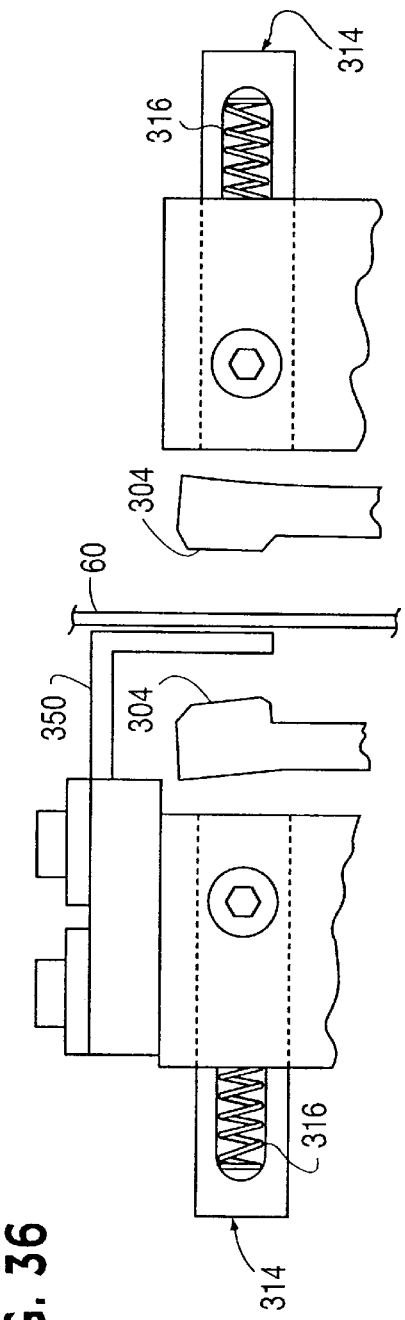
FIG. 35
FIG. 36

CREDIT CARD EMBOSSING SYSTEM, EMBOSSER AND INDENT IMPRINTER, AND METHOD OF OPERATION

FIELD OF THE INVENTION

The present invention relates to embossing systems for embossing items, such as cards, and more particularly to embossing systems for embossing credit cards.

DESCRIPTION OF THE PRIOR ART

Credit card embossing systems perform a number of well-known operations to emboss a credit card 10 having front and rear surfaces as illustrated respectively in FIGS. 1A and 1B. FIG. 1A illustrates a front surface of a typical embossed credit card and FIG. 1B illustrates the back surface of a typical embossed credit card which optionally may be a so-called "smart" card containing an integrated circuit which stores information about the cardholder. During use, the stored information is read to determine if the card is valid and also to determine information about the cardholder. The front surface of the credit card 10 includes an embossed account number field 12 and a plurality of additional cardholder information fields 14, 16 and 18 which may vary in number from the three lines of embossing as illustrated. The account number and cardholder information is embossed with an embossing device. The backside of the credit card illustrated in FIG. 1B contains a magnetic stripe 20 on which is typically written three separate tracks of magnetic information used by various industries for point of sale processing. Additionally, the account number or other information may be indent imprinted in an indent imprint field 22. If the card 10 is a smart card, it will contain an integrated circuit and connecting wiring (not illustrated) storing credit information, debit information or other information, which is accessed when the card is positioned such that an electrical contact is made with the smart card contacts 24 of a contact field 25 to an electrical device which reads the stored information.

Embossed characters contained in the account number field 12 and characters contained in the fields 14, 16 and 18 are highlighted by a heated colored foil which is forced into contact with the tops of the embossed characters. A heated platen drives colored foil into contact with the tops of the embossed characters to fuse the heated foil to the tops of the credit cards. Indent imprinting uses a male die of an embosser to force an ink conveying ribbon into the depression caused by the indent imprinting produced by the male die.

The throughput embossing rate of a credit card embosser has a substantial effect on its size. High volume units, which are capable of processing over a thousand cards an hour, have been developed by the Assignee and other companies which utilize a straightline transport system which conveys a credit card through a number of processing stations including embossing, magnetic stripe encoding, smart card processing and tipping, which is exemplified by the Assignee's U.S. Pat. No. 5,837,991. These systems are physically large and have a transport path extending several feet along which the credit cards are conveyed to stations for performing the aforementioned processing operations. Such systems are incapable of utilization in small spatial environments, such as on a desktop, or in proximity to where other business related services are performed.

Smaller embossing systems have been developed which have lower throughput rates which also have a linear transport path. These systems perform the same processes as the larger higher throughput embosser systems and are exemplified by the Assignee's U.S. Pat. Nos. 5,406,422 and 5,506,422. While embossing systems with slower throughput rates are physically smaller than the aforementioned high throughput embossing systems, they are still sufficiently large that the linear transport path is several feet long and, therefore, are also not capable of being positioned conveniently in small spaces or on a desk which is used for other purposes.

Many users of credit card embossers, such as banks and other financial institutions, have the need to issue credit cards on the spot without having an embosser with a high throughput rate. Furthermore, it is highly desirable from a spatial utilization viewpoint that lower throughput embossers be usable in a small volume such as a "tower" computer chassis. The linear transport paths which characterize the Assignee's aforementioned embossing systems, as disclosed in the aforementioned patents, do not permit such an implementation in a space such as that occupied by a tower computer chassis.

DISCLOSURE OF THE INVENTION

The present invention is an embossing system, an embosser for embossing items and a method of operation thereof. The embossed items hereinafter, without limitation in describing the preferred embodiments of the invention are referred to as "cards" or "credit cards". An embossing system in accordance with the invention has a reduced physical size, in comparison to the prior art. While reduced in physical size, an embossing system in accordance with the invention includes an embossing station for both embossing and indent imprinting a card, a magnetic encoding station for recording multiple tracks of magnetic information on a magnetic media located on the card, a smart card processing station for recording programming or other information within an integrated circuit memory and associated circuitry located within the card, and a tipping station for applying highlighting to raised embossed characters produced by the embosser within a housing having a size approximately of a tower computer chassis. The embossing system of reduced physical size in accordance with the present invention may be easily placed on a desktop in association with other common business systems which are present in banks and other commercial institutions having a need to issue credit cards without a high throughput capability to permit the complete processing of credit card blanks into finished credit cards, including embossing, magnetic encoding, smart card encoding and tipping, which heretofore has not been possible with most prior art systems because of their larger physical size.

SUMMARY OF THE INVENTION

The invention locates the various stations at which card processing operations are processed, including an embossing station on a plurality of transport paths. A carriage holds the card to be processed as it is conveyed along the transport paths and is positioned by a carriage transport at the various stations where card processing operations are preformed including embossing. The carriage transport is programmable to move the carriage to locations defined by an X,Y coordinate system and moves the carriage to positions along the plurality of transport paths which comprise horizontal and vertical transport path segments. The transport path segments compress the physical length of the transport path by permitting a close spacing of the stations which permits the complete transport path to be located longitudinally along a tower computer chassis.

In a preferred application, the complete transport path comprises a plurality of horizontal transport paths on which the plurality of processing stations are located and at least one vertical transport path connecting the plurality of horizontal transport paths. Each vertical transport path joins at least one horizontal transport path at a position between stations. In a preferred application, all of the plurality of stations are located on the horizontal transport paths and each vertical transport path joins one horizontal transport path at a location between only two stations which reduces the physical length of the horizontal transport paths to a minimum because only one open section along the joined horizontal transport path is necessary to provide clearance for all vertical movements.

The embossing station performs both embossing operations and indent operations in a compact spatial volume which contributes to the reduction in size of the overall embossing system in accordance with the invention. The embossing station includes a pair of rotatably mounted wheels which are fixed circumferentially relative to each other. Each wheel has radially projecting fingers which have dies or flat surfaces mounted at an outer radial end thereof. One of the wheels carries male dies to emboss or indent imprint characters and another of the wheels carries female dies to emboss characters or flat surfaces to support the side of the card opposite to the side which is indent imprinted. The wheels are preferably molded from plastic making them disposable which reduces the cost of manufacture of the embossing system and facilitates replacement of the wheels without great expense after an interval of use such as one year. A wheel positioning mechanism rotates the wheels to an embossing position at which individual characters are embossed or characters are indent imprinted. A simplified embosser drive mechanism, without interposers, drives a pair of rams which are movable from a first withdrawn position to a second extended position which causes the pairs of male and female dies or a pair of an indent imprint male die and a flat surface to contact the card to emboss a character or indent imprint a character. An embosser drive including a motor activates the rams. The embosser drive includes first and second pairs of pivotable links and an assembly which is coupled to a drive point which is pivotably attached to an attachment point of the second pair of pivotable links.

Indent imprinting is accomplished by the embosser with an assembly carrying a marking ribbon which is pivotably mounted to swing between a withdrawn position and a deployed position at which embossing of the card with a pair of male and female dies is performed which positions the marking ribbon between one of the male dies used for indent imprinting and the surface of the card into which an indent imprint is formed. The pivotable attachment of the assembly carrying the marking ribbon to the embosser contributes to its compact size as a consequence of only a single pair of character bearing wheels being used to perform embossing operations with additional characters on the wheels being used for indent imprinting making only the pivoting of the assembly carrying the marking ribbon necessary for implementing indent imprinting.

As a consequence of the present invention being designed to be used in "open" business space, such as in financial institutions, the front panel of the housing of the embossing system contains three openings which respectively permit the addition and removing of cards, removing of the assembly carrying the ribbon used for indent imprinting, both for the purpose of replacing the consumable roll of ribbon when used up and further removing the ribbon at night or periods of nonuse to avoid potential security problems which could occur if unrestricted access to the ribbon, which has been used for indent imprinting, were to occur and removing of the tipping assembly to permit replacement of the consumable roll of tipping material used during tipping and further removal at night or periods of nonuse to preclude the reading of customer information which is available by reading the negative image produced by the removing of the tipping material.

The overall system is controlled by a controller which may be a programmed PC. Each of the plurality of stations contains sensors which read the position of the card and other components for purposes of positioning and control. The embossing system has complete programmable control of processing at all of the stations of the embossing system.

The present invention may be practiced with conventional embossing, magnetic encoding, smart card writing and tipping devices, but preferably, is practiced with the embodiments of these devices described below. Furthermore, the invention is not limited to the aspects of the invention summarized above with other combinations and subcombinations being within the scope of the invention.

An embossing system in accordance with the invention including a plurality of stations including an embossing station; a carriage for holding an item to be processed by the system at the plurality of stations including the embossing station; a carriage transport which moves the carriage while holding the item to be processed along a plurality of spaced apart transport paths; and wherein at least one station is disposed on each of the plurality of transport paths and the carriage transport moves the carriage holding the item along the plurality of transport paths to each of the plurality of processing stations at which processing is performed on the item. The plurality of processing paths are vertically separated and located in a vertical plane. Each of the plurality of transport paths are horizontal paths. The transport paths further comprise at least one vertical transport path connecting the plurality of horizontal transport paths, each vertical transport path joining at least one horizontal transport path between stations located on the at least one horizontal transport path to which each vertical transport path is joined. All of the plurality of stations are located on the horizontal paths and each vertical transport path joins the at least one horizontal path at a location between at least one station which is located inboard from another station located on the at least one horizontal transport path to which each vertical transport path is joined.

A magnetic encoding station is disposed on one of the plurality of transport paths for encoding a magnetic media on the item.

The embossing station is programmable to emboss the item with a plurality of characters which are formed by contact of corresponding pairs of male-female dies against a front and a back surface of the item to-emboss at least one line of characters. The embossing station further indent imprints the item by contact of pairs of male dies and a corresponding flat surfaces respectively against the front and the back surface of the item with a marking ribbon disposed between the male dies and one surface of the item so that the male die drives the ribbon into one surface of the item when the male die contacts the ribbon and the flat surface contacts another surface of the item.

The embossing station further comprises an assembly carrying the marking ribbon which is pivotably mounted to swing between a withdrawn position at which embossing of if the item with the pair of male and female dies is performed and a deployed position which positions the marking ribbon between one of the male dies used for indent imprinting and the surface of the item into which indent imprinting is performed.

A tipping station is disposed on one of the plurality of transport paths at which highlighting is applied to raised embossed characters.

A smart card processing station is disposed on one of the plurality of transport paths for writing information into a memory located within the item.

A tipping station is disposed on one of the plurality of transport paths at which highlighting is applied to raised embossed characters; and the embossing station is located on one card transport path and the tipping station, smart card processing station and the station for encoding a magnetic media are located on another card transport path.

The embossing station further comprises a pair of rotatably mounted wheels which are fixed circumferentially relative to each other, each wheel having radially projecting fingers which have dies or flat surfaces mounted at an outer radial end thereof, one of the wheels carrying dies in a form of male characters and another of the wheels carrying female dies in a form of characters or flat surfaces; a wheel positioning mechanism for rotating the wheels to an embossing position at which individual characters are embossed into the item or at which characters are indent imprinted into the item; and an embosser drive mechanism for driving pairs of male and female dies or male dies and flat surfaces inward into contact with the front and back surface of the item to produce an embossed character or an indent imprinted character; and wherein the carriage transport moves the item to be embossed and indent imprinted to programmable X,Y coordinates between individual pairs of male and female dies, or a male die and a flat surface to emboss or indent imprint a least one line of characters.

The embosser drive further includes a pair of rams which are movable from a first withdrawn position to a second extended position which causes the pairs of male-female dies or an indent imprint die and a flat surface to contact the item to emboss a character or indent imprint a character; and a drive which activates the pair of rams including a first pair of pivotable links which pivot about a pivot axis which respectively pivot between a withdrawn position to an extended position which drive the rams between the first withdrawn position and the second extended position; and a motor, coupled to the first pair of pivotable links, for driving the first pair of pivotable links between the withdrawn and extended positions.

The embosser drive further includes a second pair of pivotable links, one of the second pair of links being pivotably attached to one of the first pair of pivotable links and another of the second pair of pivotable links being attached to another of the first pair of pivotable links, the second pair of pivotable links also being pivotably attached together at a drive point; and an assembly, coupled to the drive point and to the motor, which reciprocates the drive point between first and second positions which cause the corresponding movement of attachment points of the first and second pairs of links between first and second positions which causes the pair of rams to move between the first withdrawn position and the second extended position.

The embossing station is located on one card transport path and the tipping station, smart card processing station and the station for encoding a magnetic media are located on another card transport path.

A supply station contains a stack of items to be processed; and a picking mechanism picks individual items from the stack and conveys an individual picked item to a position along one of the spaced apart transport paths for holding by the carriage.

A surface of the item which is to be embossed is horizontally disposed when the individual items are in the stack; and the picking mechanism removes an item in the stack which is located in a horizontal plane and rotates the individual item from the horizontal plane to a vertical plane in which the carriage holds the item for processing by the plurality of stations including the embossing station.

The plurality of the spaced apart transport paths are disposed parallel to a longitudinal dimension of a housing containing the embossing system; and a front surface of the housing is attached at an end of the longitudinal dimension of the housing through which an access opening is provided to provide the items to be processed by the embossing system.

A tipping station is disposed on one of the plurality of transport paths at which highlighting is applied to raised embossed characters; and wherein the plurality of spaced apart transport paths are disposed parallel to a longitudinal dimension of the housing containing the embossing system; and a front surface of the housing is attached at an end of the housing through which a pair of access openings are provided through which the assembly and the tipping station are respectively removed.

An embosser in accordance with the invention includes a pair of rotatably mounted wheels which are fixed circumferentially relative to each other, each wheel having radially projecting fingers which have characters mounted at an outer radial end thereof, one of the wheels carrying male dies and one of the wheels carrying female dies with pairs of male and female dies being activated to emboss characters; a wheel positioning mechanism for rotating the wheels to an embossing position at which individual characters are embossed into an item by activation of a corresponding pair of male and female dies; a carriage for holding an item to be embossed with the characters mounted on the outer radial end of the radially projecting fingers; a carriage transport which moves the carriage along orthogonal X and Y axes while holding the item to be embossed to position the item for embossing of characters; a pair of rams which are movable from a first withdrawn position to a second extended position which activates corresponding pairs of male and female dies to contact the item to emboss a character; an embosser drive, coupled to the pair of rams, for driving the pair of rams between the first withdrawn position and the second extended position to cause individual characters to be embossed at the embossing position; and a controller for controlling the wheel positioning mechanism, the carriage, the carriage transport and the embosser drive.

The embosser drive includes a first pair of pivotable links which pivot about a pivot axis which respectively pivot between a withdrawn position and an extended position which drive the rams between the first withdrawn position and second extended position and a motor, coupled to the first pair of pivotable links, for driving the first pair of pivotable links between the withdrawn and extended positions.

The embosser drive further includes a second pair of pivotable links, one of the second pair of links being pivotably attached to one of the first pair of pivotable links and another of the second pair of pivotable links being attached to another of the first pair of pivotable links, the second pair of pivotable links also being pivotably attached together at a drive point; and an assembly, coupled to the drive point and to the motor, which reciprocates the drive point between first and second positions which cause the corresponding movement of attachment points of the first and second pairs of pivotable links between first and second positions which causes the pair of rams to move between the first withdrawn position and the second extended position.

The embosser drive further includes a crank driven by the motor including an eccentric point which moves eccentrically relative to an axis of rotation of the motor to which the drive point is coupled with rotation of a shaft of the motor causing the drive point to reciprocate.

A plurality of male dies and corresponding flat surfaces mounted at the outer radial ends of the fingers are provided for indent imprinting characters into one side of the item with a marking ribbon located between the male die and one surface of the item when the male die contacts the marking ribbon; an assembly carries the marking ribbon which is pivotably mounted relative to the dies and the flat surface to swing between a withdrawn position at which embossing of the item with the male and female dies is performed and a deployed position which positions the marking ribbon between the male die and the surface of the item into which indent imprinting is performed; and the controller controls swinging of the assembly carrying the marking ribbon between the withdrawn position and the deployed position. The pairs of wheels are molded from plastic. The male dies and flat surfaces used for indent imprinting and embossing special characters are metallic and are removably attached to the outer radial end of a plurality of fingers of each of the pair of wheels.

A method of embossing an item in an embossing system including a plurality of stations including an embossing station, a carriage for holding an item to be processed by the system at the plurality of stations including the embossing station, a carriage transport which moves the carriage while holding the item to be processed, and at least one station disposed on a plurality of spaced apart transport paths in accordance with the invention includes holding the item to be embossed with the carriage; moving the carriage transport along the plurality of spaced apart transport paths sequentially to each of the stations on the spaced apart transport paths; and at each of the stations performing processing on the item including embossing the item at one of the stations. At least two horizontal transport paths and at least one vertical transport path are connected to at least one of the at least two horizontal transport paths; and wherein all of the stations are located on the at least two horizontal transport paths. The at least one vertical transport path is connected to at least one of the at least two horizontal transport paths at a single location therein. The connection is between a pair of stations located on one of the at least two horizontal paths. The at least two horizontal transport paths are parallel to a longitudinal axis of a housing containing the embossing system. The transport paths are located in a vertical plane; and the embossing station comprises a pair of embossing wheels having a horizontal axis of rotation and a plane between the wheels in which the item is embossed is disposed in the vertical plane.

BRIEF DESCRIPTION OF THE DRAWINGS

FIGS. 8–10 illustrate an embodiment of the carriage and carriage transport used with the practice of the present invention with FIG. 8 being a side elevational view, FIG. 9 being a top elevational view and FIG. 10 being a side elevational view.

FIGS. 11, 12A–12E, 13 and 14 illustrate an embodiment of the picker used with the practice of the present invention with FIG. 11 being a side elevational view, FIG. 12A being a front elevational view with the picker mechanism exploded from the remainder of the picker, FIGS. 12B–12E illustrating the sequence of events which occur to orient the card in a vertical orientation, FIG. 13 being a rear elevational view and FIG. 14 being a top plan view.

FIGS. 15–19 illustrate an embodiment of an embosser used with the practice of the present invention with the assembly for pivoting the indent imprint ribbon being omitted, with FIGS. 15 and 16 being opposite side elevational views, FIG. 17 being a top plan view of the embosser drive assembly, FIG. 18 being a side elevational view of the embosser drive assembly and FIG. 19 is a partial sectional of the first pair of pivotable links of the embosser drive.

FIGS. 20–24 illustrate an embodiment of the embosser used with the practice of the present invention including the assembly carrying the indent imprint ribbon for indent imprinting, with FIG. 20 being an end elevational view, FIG. 21 being a side elevational view, FIG. 22 being a side elevational view of the assembly carrying the indent imprint ribbon, FIG. 23 being a partial sectional end elevational view and FIG. 24 being a top plan view of the assembly carrying the indent imprint ribbon.

FIG. 31 illustrates a partial side sectional view of FIG. 30.

FIGS. 32–34 illustrate an embodiment of a tipper used with the practice of the present invention with FIG. 32 being a top plan view, FIG. 33 being a side elevational view and FIG. 34A being a view of the cassette for carrying the tipping material and FIG. 34B being a cutaway view of FIG. 34A to expose underlying structure of the tipper and the movement of tipping material.

FIGS. 35–36 illustrate a view of operation of the embosser during embossing of characters.

Like reference numerals identify like parts throughout the drawings.

DESCRIPTION OF THE PREFERRED EMBODIMENTS

Figure 1A:
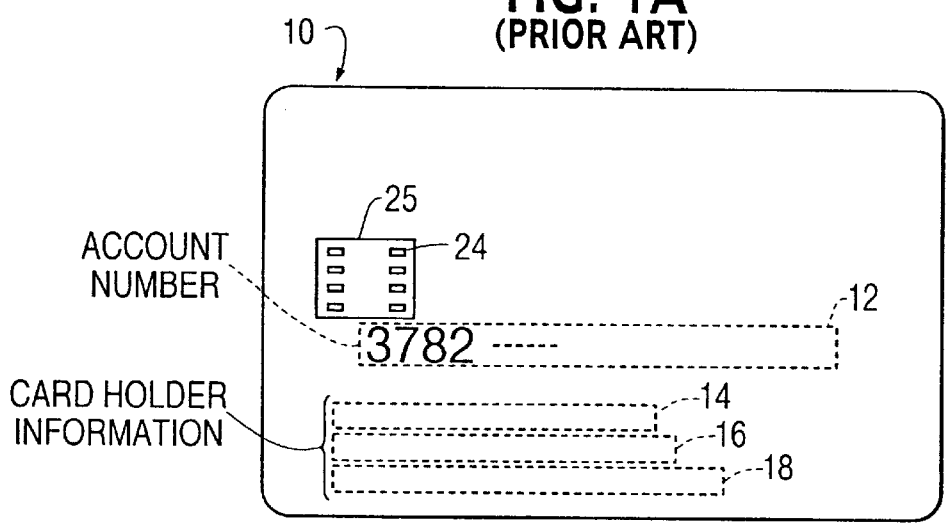
FIGS. 1A and 1B illustrate respectively front and back surfaces of a prior credit card in accordance with the prior art which may be processed with the present invention.
Figure 1B:
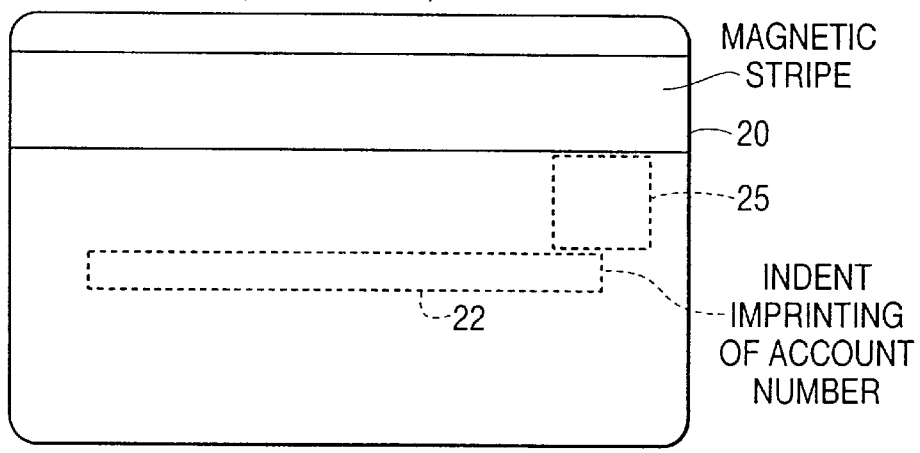
Figure 2:
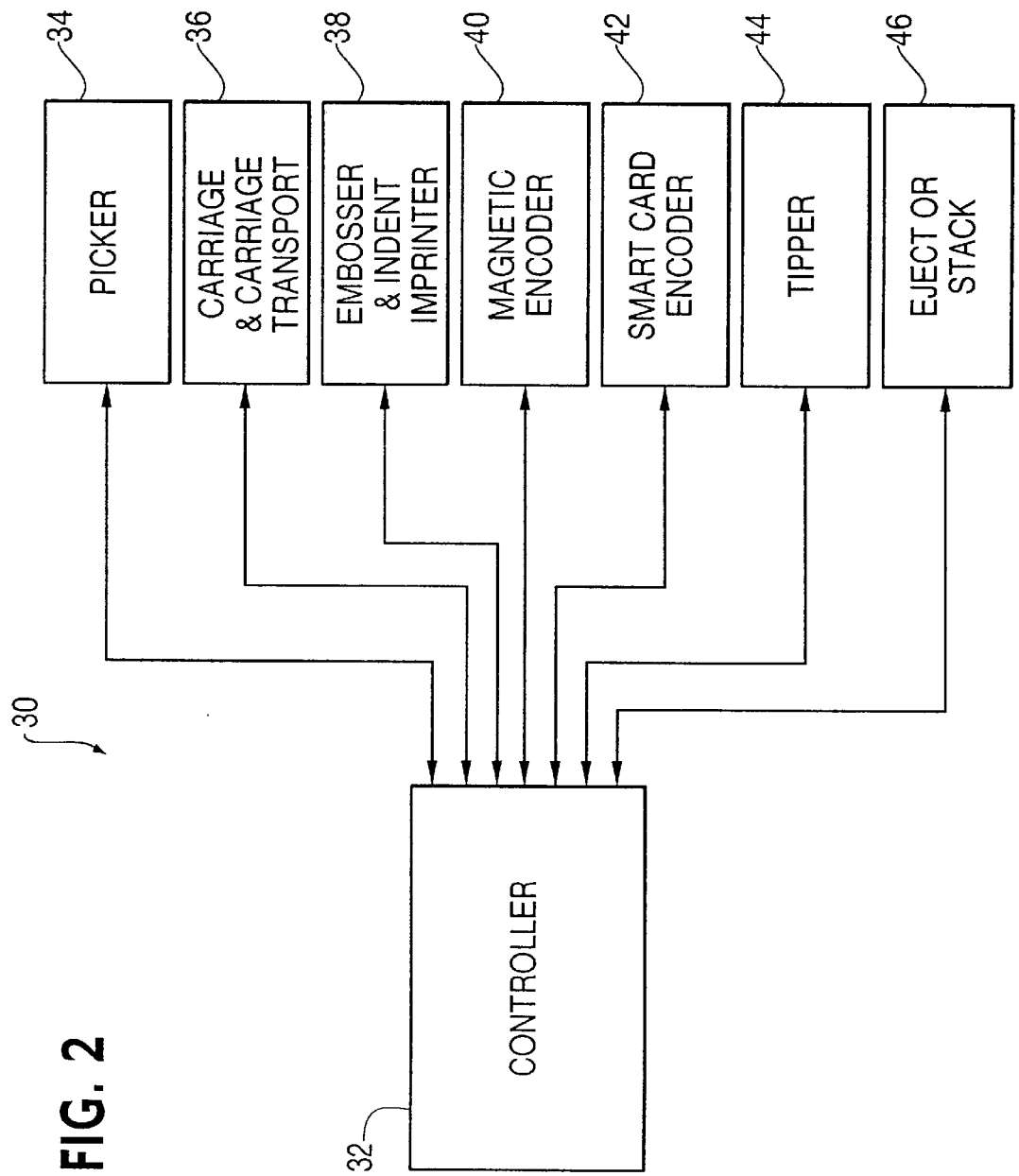
FIG. 2 illustrates a block diagram of the control of the present invention.

FIG. 2 illustrates a block diagram of an embossing system 30 in accordance with the present invention. The system 30 is controlled by a controller 32, which is a programmed PC or other processing device which provides computer control to each of a plurality of stations at which card operations are performed as described below in conjunction with FIG. 3, which include a picker 34, which removes individual cards from a supply stack of cards to be embossed, and conveys the individual picked cards to a position at which they are held by a carriage and conveyed or a carriage and carriage transport 36, embosser and indent imprinter 38, a magnetic encoder 40, a smart card encoder 42, tipper 44 and eject or stacking apparatus 46 at which a correctly or incorrectly processed card is discharged from the carriage. Each of these devices, which are controlled by the controller 32, contain one or more sensors which provide positioning information or other information which is utilized by the controller for the overall digital control of the system to perform credit card embossing. Each of the picker 34, carriage and carriage transport 36, embosser and indent imprinter 38, magnetic encoder 40, smart encoder 42, and tipper 44 are described in detail below but the invention is not limited thereto. The overall processing performed by the system 30 produces a credit card in accordance with the prior art of FIGS. 1A and 1B.

Figure 3:
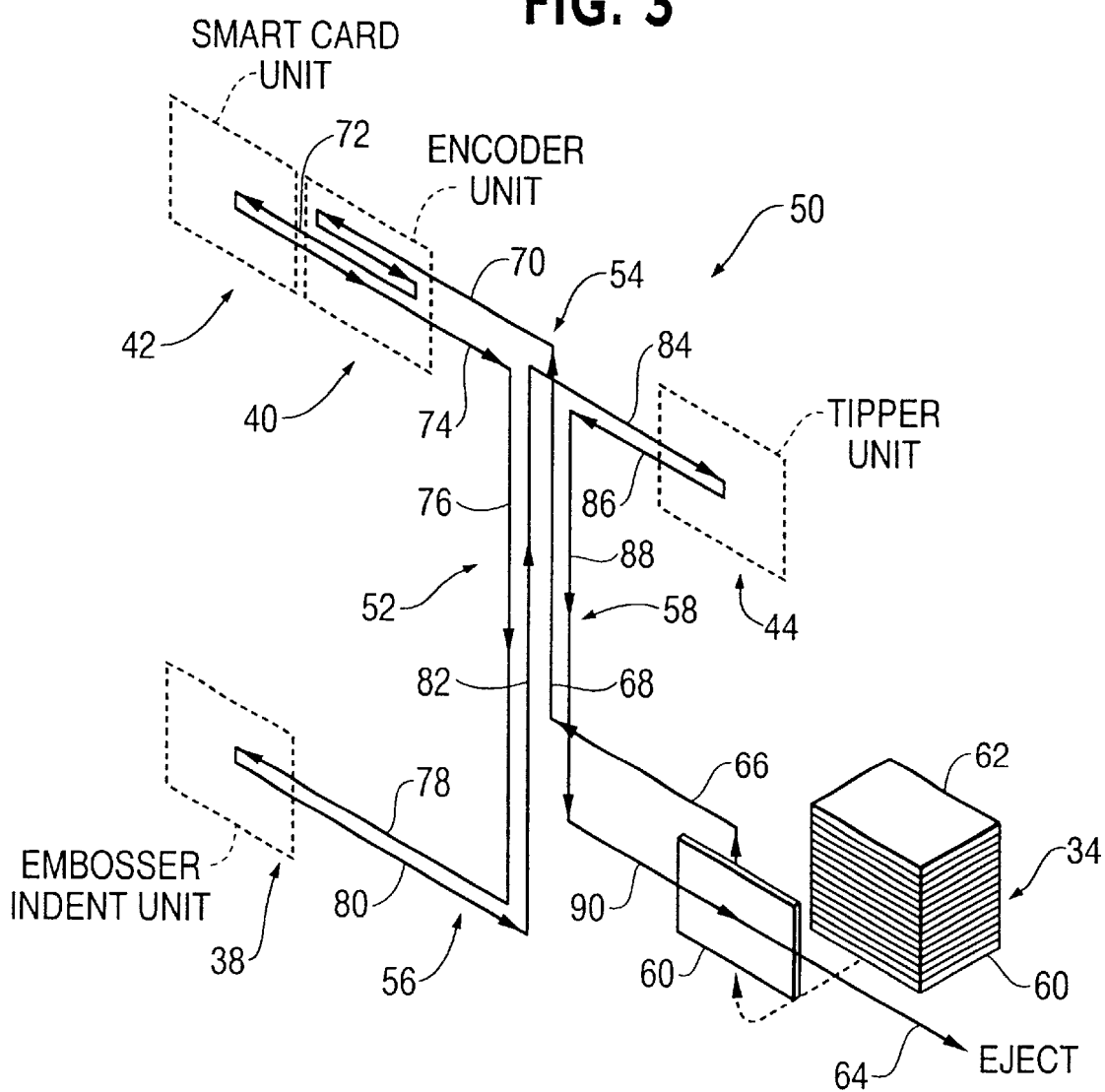
FIG. 3 illustrates a preferred embodiment of processing performed in accordance with the present invention at a plurality of stations located along a transport path along which cards are conveyed during processing.
Figure 6:
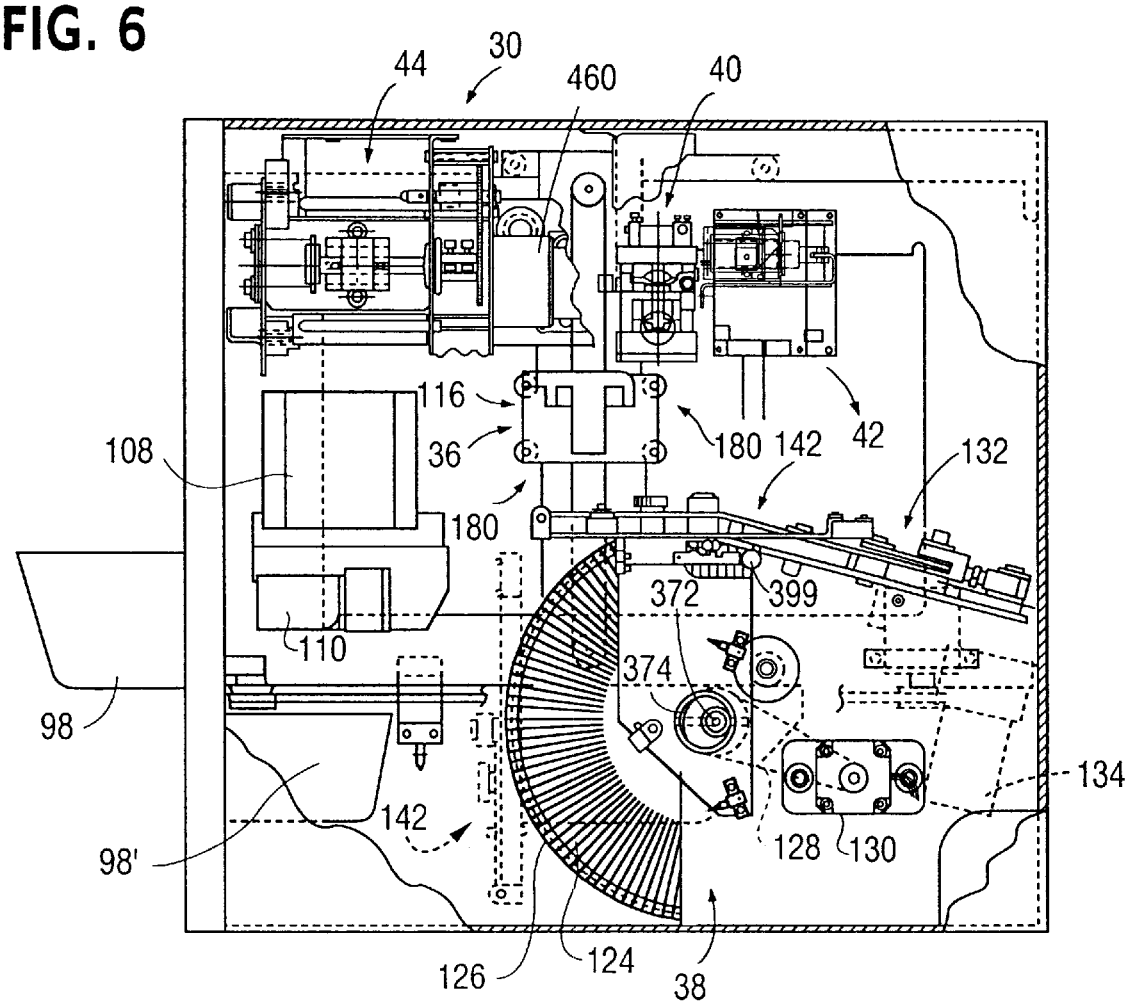

FIG. 3 illustrates a preferred embodiment 50 of the complete transport path 52 of the embossing system 30 in accordance with the present invention which permits containment within a housing such as that utilized by a tower computer. The reduction in size which is achieved with the complete transport path 52 of the present invention is consequent from locating the overall configuration of the various units on a transport path which is not in line as in the prior art. Instead, the complete transport path 52 is comprised of a plurality of horizontally disposed transport paths which, as illustrated, are comprised of an upper horizontal transport path 54, lower horizontal transport path 56 and intermediate transport path 66 which are connected together by at least one and, as illustrated, a plurality of vertical transport paths 58 which are joined to at least one and, as illustrated, each of the upper horizontal transport path, lower horizontal transport path and intermediate transport path. While not illustrated, an individual card 60 is held by a carriage (identified in FIG. 8 by numeral 162) which is conveyed by a carriage transport, as described below in conjunction with FIGS. 8–10, which moves the card 60 held by the carriage along the transport paths as indicated in FIG. 3. Each card 60 to be processed by the embossing system 30 is picked from the bottom of a stack of cards 62 and conveyed horizontally and then rotated into a vertical orientation as illustrated by the picker 34 as described below in conjunction with FIGS. 11–14. The carriage transport (identified in FIG. 8 by numeral 180), as described below under control of the controller 32, conveys the card 60 along the complete transport path 52 to each of the embosser indent unit 38, smart encoder unit 40, smart card unit 42 and tipper unit 44 which are located at separated stations along the upper horizontal transport path 54 and the lower horizontal transport path 56 and then to an eject position 64 which may be either through the front of the housing of the system as illustrated in FIG. 6 into a bin 98 or, alternatively, into a bin 98' inside of the housing illustrated in FIG. 6 located below the lower horizontal transport path 56. An erroneously processed card may be discharged separately from the properly processed cards. An error message may be used to signal an erroneously processed card. Furthermore, the picker 34 may be activated to provide a free fall from the carriage through a space in the picker to the tray below the transport path to collect ejected cards. The ejection of a card may be in association with a stacking device to collect processed cards which is controlled by controller 32.

The carriage transport moves the card 60 along the path as indicated under the program control of the controller 32 along a series of X,Y coordinates which define the complete transport path 52 as illustrated which in the preferred application of the invention is located in a vertical plane. However, it should be understood that the invention is not limited to the complete transport path 52 being located in a vertical plane, to any number of horizontal and vertical transport paths or to a number or placement of processing stations along the complete transport path.

Movement of the card 60 from the initial position at which it is first held by the carriage occurs as follows. The card 60 moves horizontally along the longitudinal axis of the housing illustrated in FIG. 4 toward the rear of the housing along intermediate horizontal transport path 66 which is within the vertical plane containing the upper transport and lower transport paths 54 and 56 to a position which is horizontally between and underneath the encoder unit 40 and the tipper unit 44 which permits the card transport to move the carriage vertically upward along vertical transport path segment 68 to a point of joining with the upper horizontal transport path 54 which clears the encoder 40, smart encoder 42, and tipper 44. The carriage transport moves the carriage horizontally backward along upper horizontal transport path segment 70 to the magnetic encoder 40 described below in conjunction with FIGS. 25 and 26 where one or more tracks of magnetic information are encoded longitudinally along the magnetic media 20 and read under the control of controller 32. The arrows indicating movement at the encoder unit 40 backward and forward are indicative of the encoding of one or more magnetic tracks on the magnetic medium 20 of FIGS. 1A and 1B and the reading thereof to determine proper encoding.

Thereafter the carriage transport moves the carriage holding the card 60 along upper horizontal transport path segment 72 to the smart card encoder 42 at which smart card processing may be performed with the smart card encoder described below in conjunction with FIGS. 27–31. It should be understood that the processing of a credit card by the smart card encoder 42 is optional. Today not all types of credit cards which could be embossed with the present invention have an integrated circuit memory contained therein.

Figure 4:
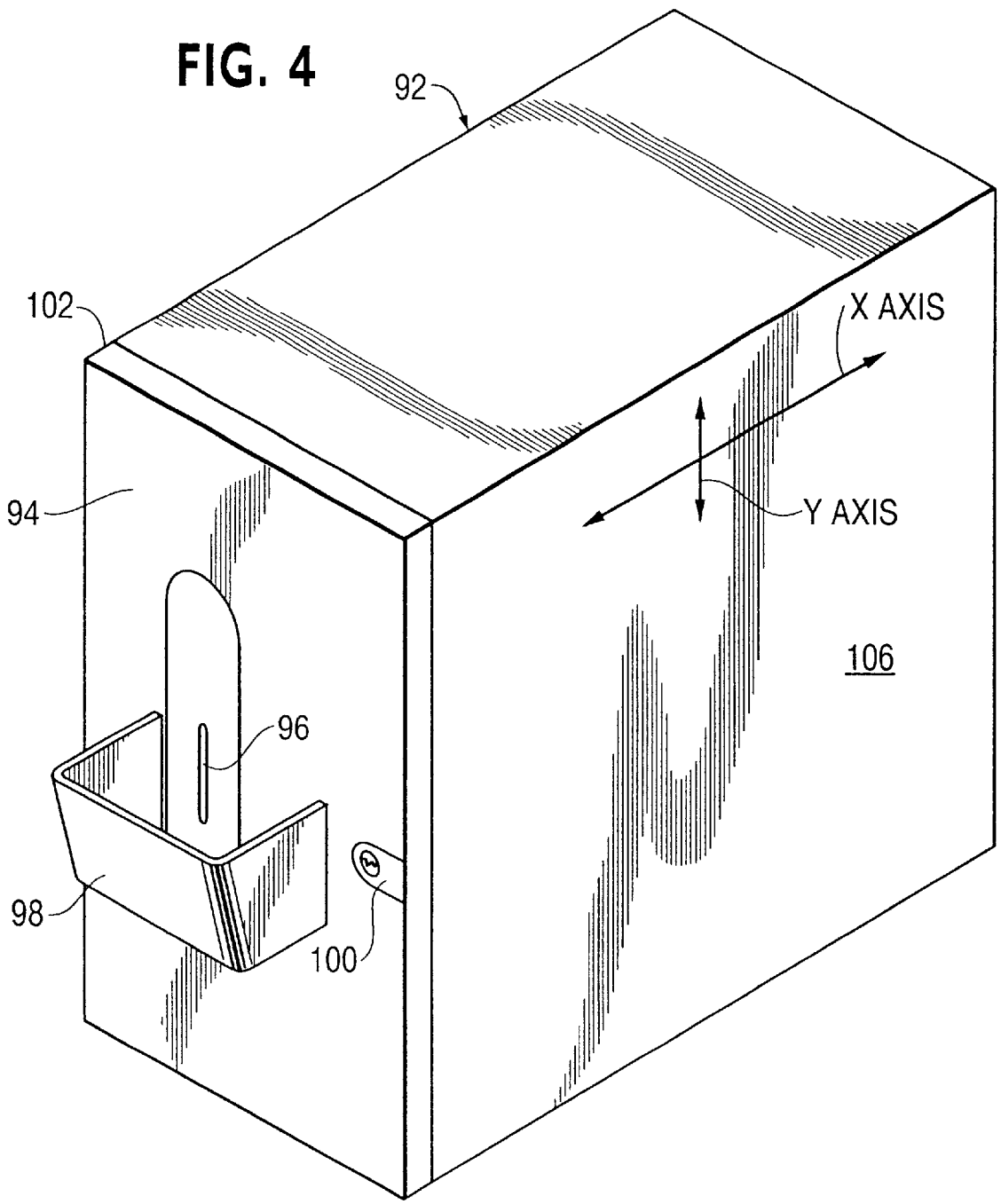
FIG. 4 illustrates an isometric view of the housing of the present invention.

After processing is complete by the smart card encoder 42, the carriage transport moves the carriage along upper horizontal transport path segment 74 towards the front of the housing of FIG. 4 to the point of joining with the vertical transport paths 58. The card transport moves the carriage downward along vertical transport path segment 76 to a point of joining the lower horizontal transport path 56. The carriage transport moves the carriage along lower horizontal transport path segment 78 along the longitudinal dimension of the housing of FIG. 4 toward the rear of the embossing system to the embosser and indent unit 38. At the embosser and indent unit 38, preferably indent imprinting occurs first because it is less likely to deform the card 60 followed by embossing of one or more lines of characters.

The card transport, after completion of indent imprinting and embossing, moves the carriage holding the card 60 forward along lower horizontal transport path segment 80 to a point of joining with the vertical transport paths 58. The carriage transport then moves the carriage holding the card 60 upward along vertical transport path segment 82 to a point of joining the upper horizontal transport path 54.

The carriage transport then moves the carriage holding the card 60 forward along upper horizontal transport path segment 84 to the tipper 44 to highlight the embossed characters in accordance with conventional practice in the processing of credit cards as discussed below in conjunction with FIGS. 32–34, which applies tipping to the raised embossed characters produced by the embosser as described below in conjunction with FIGS. 15–19. After tipping is completed by the tipper 44, the carriage transport moves the carriage holding the card 60 along upper horizontal transport path segment 86 to a point adjoining the vertical transport paths 58. The carriage transport then moves the carriage holding the card 60 downward along vertical transport path segment 88 to a point adjoining the lower horizontal transport path 56. The carriage transport then moves the carriage holding the card 60 forward along lower horizontal transport path segment 90 to the eject or stacking position 64 at which the card is released from the carriage and optionally stacked.

While not described in the above processing sequence, detection of erroneous processing at any of the aforementioned stations, which is sensed by various position sensors or information sensors, causes the controller 32 to alter the above-described sequence to convey the card to the eject position 64, attempt to reprocess the card if the previous processing is not destructive, or other position to which erroneously processed cards are conveyed for disposal. The controller 32 will also cause the operator of the embossing system to be notified by one or more communications through a monitor or other output devices associated with the controller (which are not illustrated and are understood to be associated with a conventional PC which is the preferred from of controller used with the present invention).

The above-described complete transport path 52, while completely finishing a credit card for issuance, substantially reduces the longitudinal dimension and volume of the embossing system which is required to perform credit card processing in comparison to the prior art. The reduction in longitudinal dimension and volume of the embossing system is a direct consequence of the rectilinear motion of the carriage transport along a series of horizontal and vertical segments to position the card at the stations required to complete card processing. The location of the embosser and indent unit 38, magnetic encoder 40, smart card encoder 42, and tipper 44, at spaced apart locations along the upper horizontal transport path 54 and the lower horizontal transport path 52 permits the volume and longitudinal spacing required for positioning of these units to be substantially reduced in comparison with the prior art. The vertical transport paths 58 permit the carriage transport to convey the carriage upward between only a single pair of spaced apart units, such as, but not limited to, the magnetic encoder 40 and the tipper 44 which reduces the total required spacing between the units along the longitudinal dimension of the housing to a minimum. When the overall transport length for locating each of the aforementioned stations is located along a single horizontal path as in accordance with the prior art, it is not possible to reduce the physical size of an embossing system into a housing the size of a tower computer housing.

FIG. 4 illustrates an isometric view of the outer housing 92 of an embodiment of an embossing system 30 in accordance with the present invention. The housing 92 may have the approximate dimensions of a tower computer housing which is conventionally used with many PCs today. The front 94 of the housing 92 contains an opening slot 96 through which finally processed cards 60 (not illustrated) are ejected into a holding bin 98 from which they are removed. A latch 100, which may be a lock, is used to prevent access to the interior of the embossing system where the stack of cards 62 to be embossed is stored and additionally, where the consumable rolls of material used for indent imprinting and tipping may be removed by opening of the front door 102 as described below in conjunction with FIG. 7. It should be understood that the complete processing path 52, as described above in conjunction with FIG. 3, extends longitudinally from the front surface 94 along the longitudinal X axis dimension of the housing 92 toward the rear of FIG. 4 and vertically along the Y axis.

Figure 5:
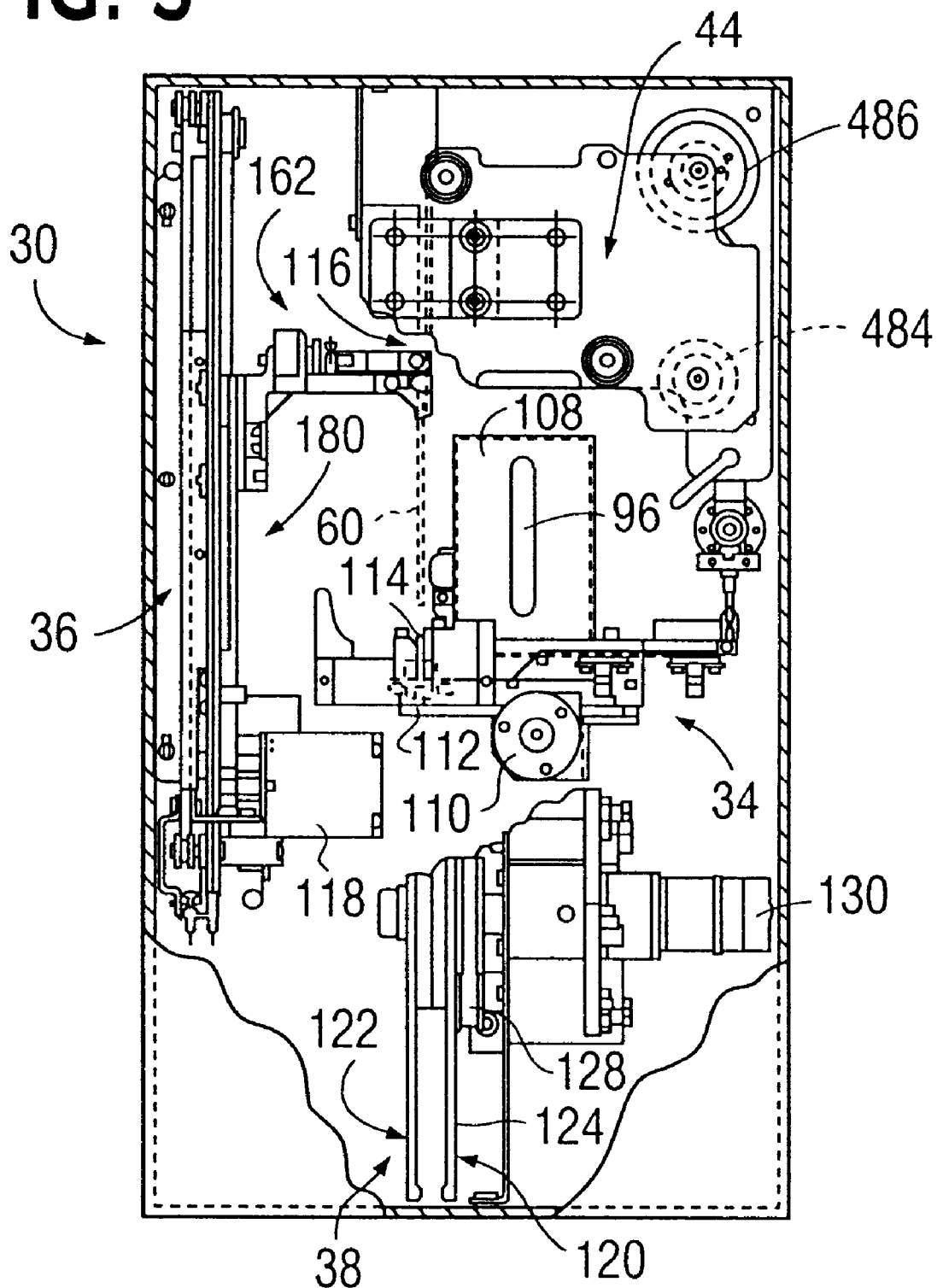
FIGS. 5 and 6 respectively illustrate front and side elevational views of an embossing system in accordance with the present invention.

FIGS. 5 and 6 illustrate respectively front and side elevational views of the picker 34, carriage and carriage transport system 36, embosser and indent imprinter 38, magnetic encoder 40, smart card encoder 42 and tipper 44. The carriage and card transport 36 conveys the card 60, illustrated in phantom in FIG. 5, to the various units and positions along the complete transport path 52 of FIG. 3 discussed above. Only selected parts of the embossing system 30 are discussed in detail in conjunction with FIGS. 5 and 6 in view of the various units being individually discussed in more detail below.

The picker 34 includes a removable tray 108 in which the stack of cards 62 of FIG. 3 is horizontally stacked. Individual cards 60 are picked from the bottom of stack 62 under the control of a gear motor 110 which drives a rack 112 which reciprocates the picker blade and associated structure discussed in more detail below. The picker blade (not illustrated) conveys the card 60 from a horizontal position to the vertical position illustrated in FIG. 3 at which the card is held in a card slot 114 where it is gripped by a clamp 116 of the carriage under control of the controller 62 as described below.

The clamp 116 initially grips the card 60, moves it forward toward the front of the housing 92 until the carriage transport 180 reaches a reference position at which the card is dropped, and then the card is gripped again to establish the reference position of the card for subsequent processing.

The carriage transport 180 includes a pair of stepper motors. Only the X axis stepper motor 118 is visible. The controller 32 controls the activation of the pair of stepper motors to cause the carriage and carriage transport 36 to move through the positions, as illustrated in FIG. 3, after a card 60 is clamped while resting in the card slot 114.

The embossing station 38 is comprised of a pair of embossing wheels 120 and 122 which are molded from plastic and contain pairs of male and female dies for embossing characters and pairs of male dies and associated flat surfaces for indent imprinting. The dies are located at the radially outward end of individual plastic fingers 124. The dies used for embossing are integrally formed in the molded plastic wheel in view of the plastic wheel being designed to be a replaceable element. Dies used to emboss special characters and to indent imprint characters are made of metal and attached to the ends of the plastic fingers. The pair of plastic wheels 120 and 122 are driven by a belt drive 128 which is driven by a stepper motor 130 which, under the control of controller 32, rotates the plastic wheels 120 and 122 which are fixed circumferentially relative to each other to a position at which a pair of rams which are mounted outboard of the radially outward ends of individual fingers 124 are driven from a first withdrawn position to a second extended position which causes the pairs of male and female dies or an indent imprint die and a flat surface to contact the card to emboss a character or to indent imprint a character. Power for driving the rams is produced by an embosser drive mechanism 132 which is described in detail below in conjunction with FIGS. 17–19 and is powered by a gear motor 134 which is controlled by controller 32.

The magnetic encoder 40 may be a conventional magnetic encoder, such as that as has been used by the Assignee in the above-identified patents and in its commercial embossing systems. The magnetic encoder records at least one and typically three tracks of magnetic code on the magnetic media 20 of the credit card 60. The process performed by the magnetic encoder 40, which is under the control of the controller 32, involves recording and reading each of the tracks which are written on the magnetic media 20. The content of the tracks contained on the magnetic media and how they are encoded is well known and is in accordance with standards which are recognized in the United States and throughout the world. The encoder 40 is described in more detail below in conjunction with FIGS. 25 and 26.

The smart card encoder 42 performs the well-known task of writing information into a semiconductor memory stored within the card 60. Smart card encoding is performed by a contractor of the smart card encoder 42 contacting associated contacts 24 on the front surface of the card 60 through which information is written under the control of controller 30 into the semiconductor memory.

The tipper 44 has a removable cassette (identified in FIG. 7 as number 463) containing the roll of tipping material. The removable cassette 463 is taken out through an opening in the front 94 of the housing 92 after the door 102 is pivoted open as described below in conjunction with FIG. 7. Gear motor 460 drives a take up reel 480 for collecting spent tipping material which is supplied by a supply reel 484.

Figure 23:
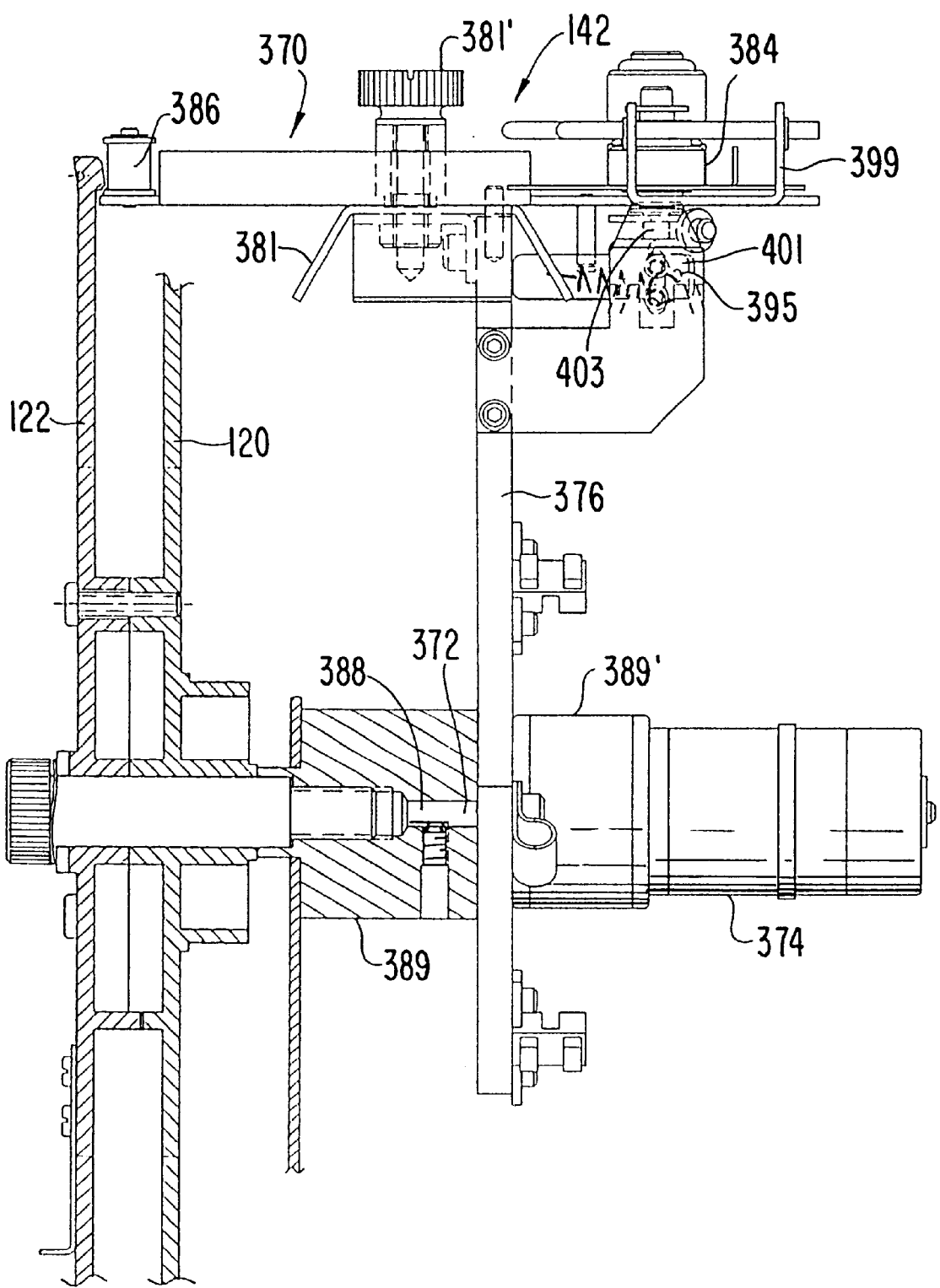
Figure 24:
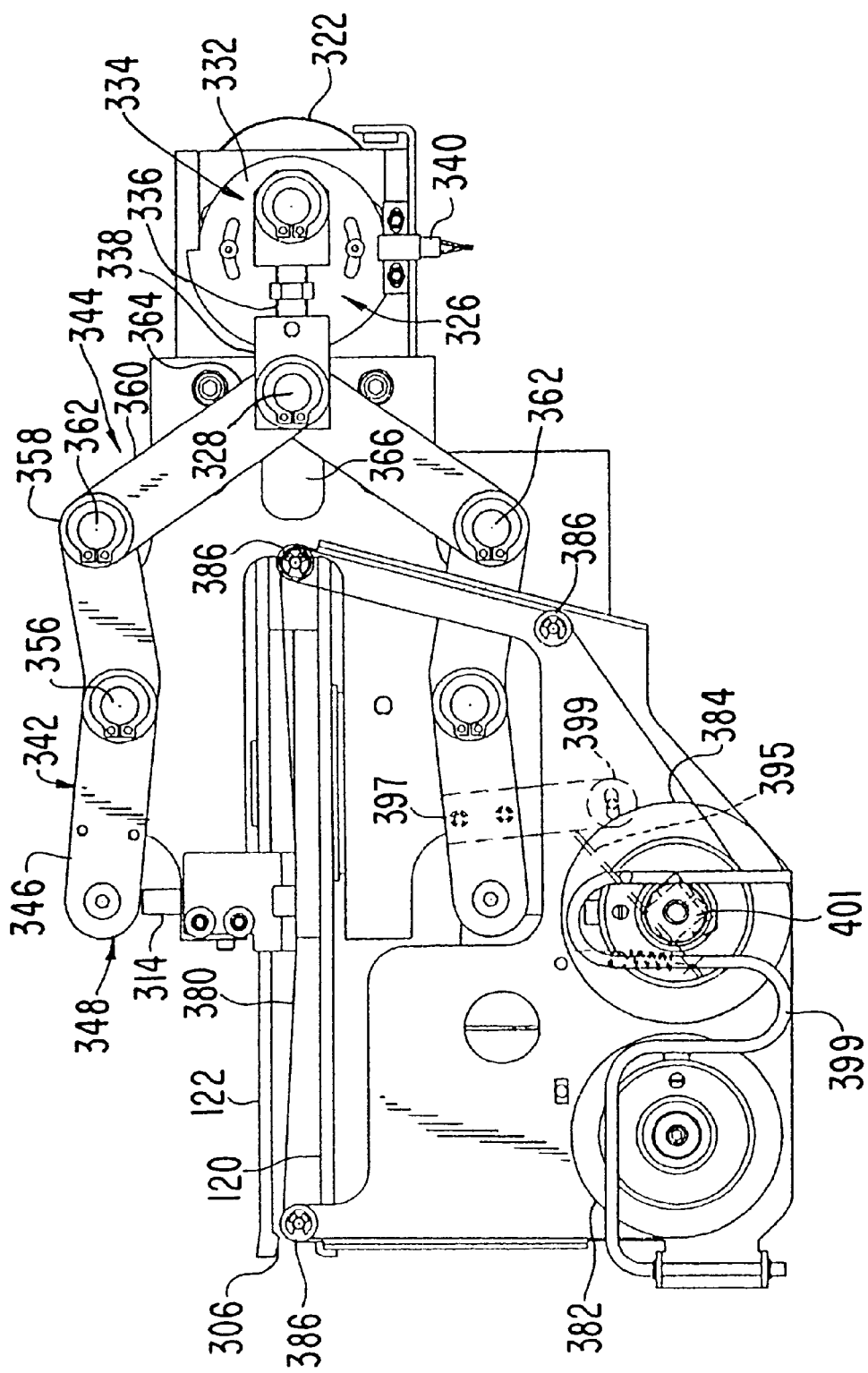

The embossing and indent imprinter 38 has a marking ribbon carrying assembly 142 which has a withdrawn position as illustrated in phantom in FIG. 6 at which individual characters are embossed by the embossing unit and a deployed horizontal position which is illustrated in further detail in FIGS. 23 and 24 discussed below. The ribbon carrying assembly 142 positions the marking ribbon (identified in FIG. 22 by reference numeral 380) between one of the male dies used for indent imprinting and the surface of the card 60 into which indent imprinting is performed. A corresponding flat surface carried by wheel 122 functions as an anvil to support the card 60 during penetration of the male indent character die into the surface of the card at indent field 22. The impact by the male die drives the marking ribbon into the depression in the plastic card caused by the die to make the depression visible to make it readable as a character in a manner which is well known in the art. The marking ribbon carrying assembly 142 is pivotably mounted about a pivot point 372 which is driven by a gear motor 374 under the control of controller 32. Except for positioning of the marking ribbon carrying assembly 142 in the horizontal position as illustrated in FIG. 6, operation of the embosser and indent imprinter to emboss characters or to indent imprint characters is identical. The power for embossing and indent imprinting is supplied by the embosser drive mechanism 132. The interior of the housing has a holding bin 98' into which the cards (either rejects or good cards) may be discharged if it is not desired to externally eject them or to stack them. While stacker is not illustrated, it should be understood that a stacker may be positioned at the eject position in FIG. 3 or at another position on the complete transport path 52.

With reference to FIG. 6, the magnetic encoder 40, smart card encoder 42 and tipper 44, are located on the upper horizontal transport path 54 of FIG. 3 and the embosser and indent imprinter 38 are located on the lower horizontal transport path 56. As illustrated, the carriage and carriage transport 36 are located along the vertical transport paths 58 which define the space along which the carriage and carriage transport moves between horizontal transport paths 54, 56 and 66.

The placement of the vertical transport paths 58 between a single pair of the processing stations on the upper transport paths 54 provides the minimum horizontal clearance necessary to convey the card 60 vertically between the horizontal transport paths. Furthermore, if plural processing stations are located along more than one horizontal processing path, horizontal space along the longitudinal axis of the chassis is minimized by joining the vertical transport paths at only a single vertically aligned position on the horizontal transport paths. As a result, the necessary vertical clearance to move between all horizontal transport paths is minimized.

Figure 7:
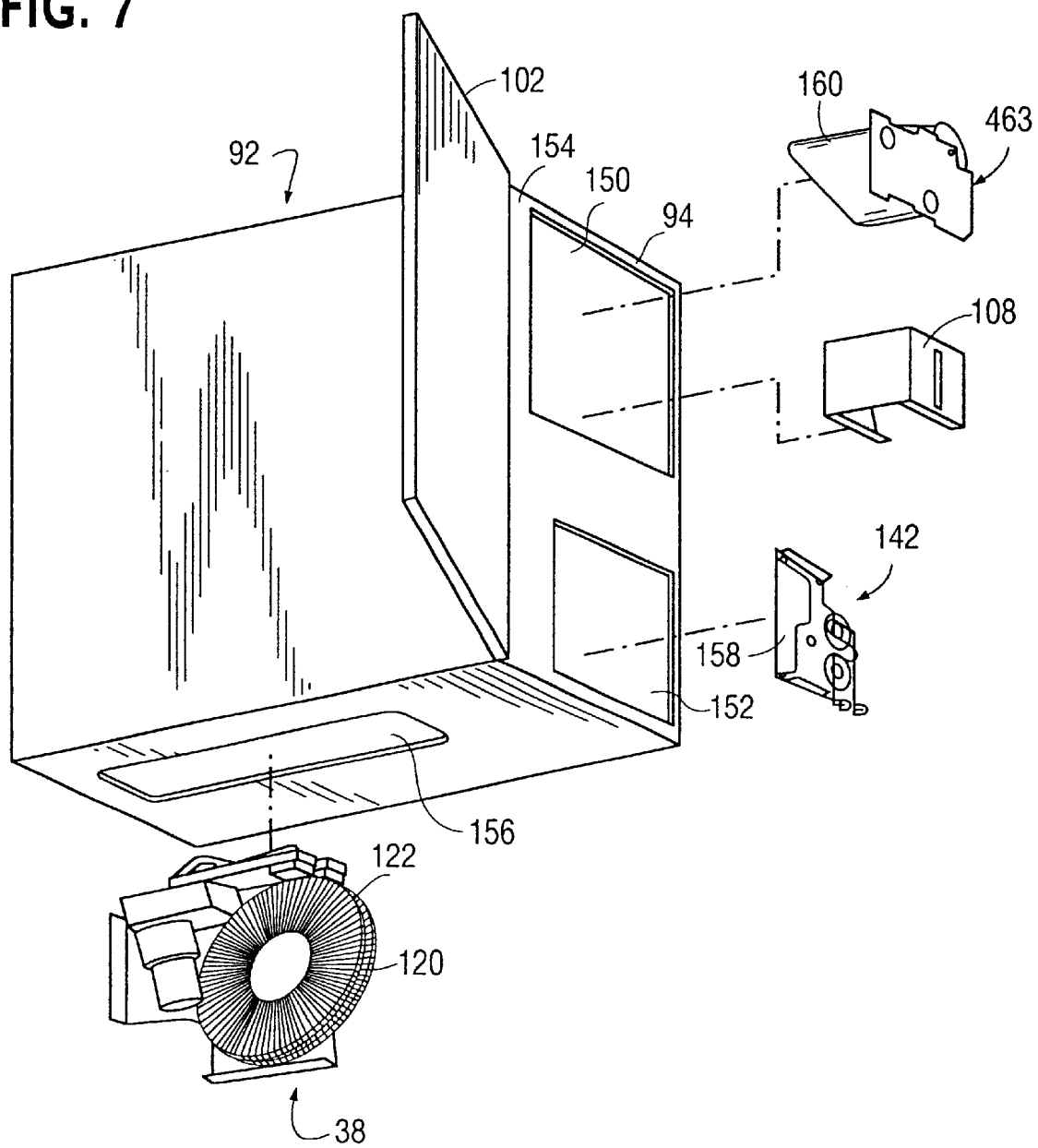
FIG. 7 illustrates a view of the housing of FIG. 6 illustrating access openings through which the embossing wheels, the indent imprint ribbon assembly, the tray for holding cards to be embossed and tipping station are removed for service and security purposes.

FIG. 7 illustrates the housing 92 of the embossing system 30 with the front door 102 in the open position which reveals openings 150 and 152 in an inner front wall 154 and an opening 156 through the bottom of the housing. The openings 150, 152 and 156 provide access both for servicing and the replacement of consumables in the embossing system 30 including the removable tray 108 for holding the horizontally stacked cards 62, the marking ribbon carrying assembly 142 and the tipper material cassette 463. These openings permit a new marking ribbon and tipping material to be introduced. Removing of the embosser unit is primarily for periodic servicing purposes to replace plastic wheels 120 and 122 in view of the plastic molded wheels being designed to be replaced in order to lower the overall cost of the unit after the embossing of a substantial number of cards, such as 25,000, over a year's use. The removal of the tray 108 is to facilitate the loading of a stack of cards 62 which are to be embossed over a period of time. The removal of the marking ribbon carrying assembly 142 and the tipper material cassette 463 is both for security purposes and for the replacement of the marking ribbon 158 of the marking ribbon carrying assembly 142 and the tipping material 160 of the tipper material cassette 463.

In view of the extreme security required for the processing of credit cards, the present invention has been designed to facilitate removal of consumables and unprocessed cards 60 during times when the embossing system 30 is not in use. The tray 108 is removed to prevent access to any unprocessed cards which could be fraudulently processed. The marking ribbon carrying assembly 142 and the tipper material cassette 463 are removed to prevent unauthorized reading of account numbers and other information which may be read from the consumed material in view of the ribbon 158 and the tipping material 160 carrying an image of the characters which are embossed or indent imprinted which provides unauthorized access to valid credit card accounts.

Figure 8:
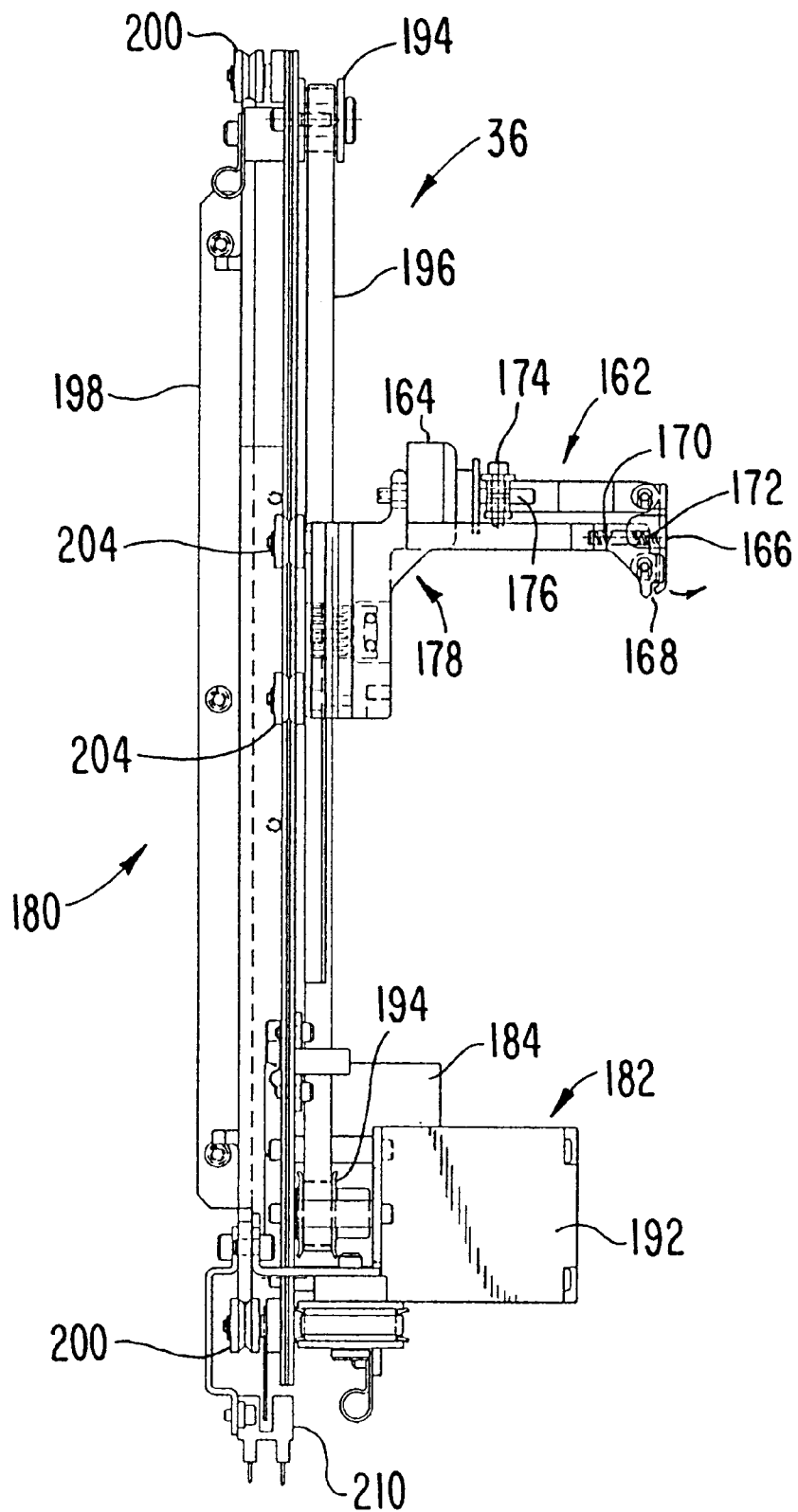
Figure 9:
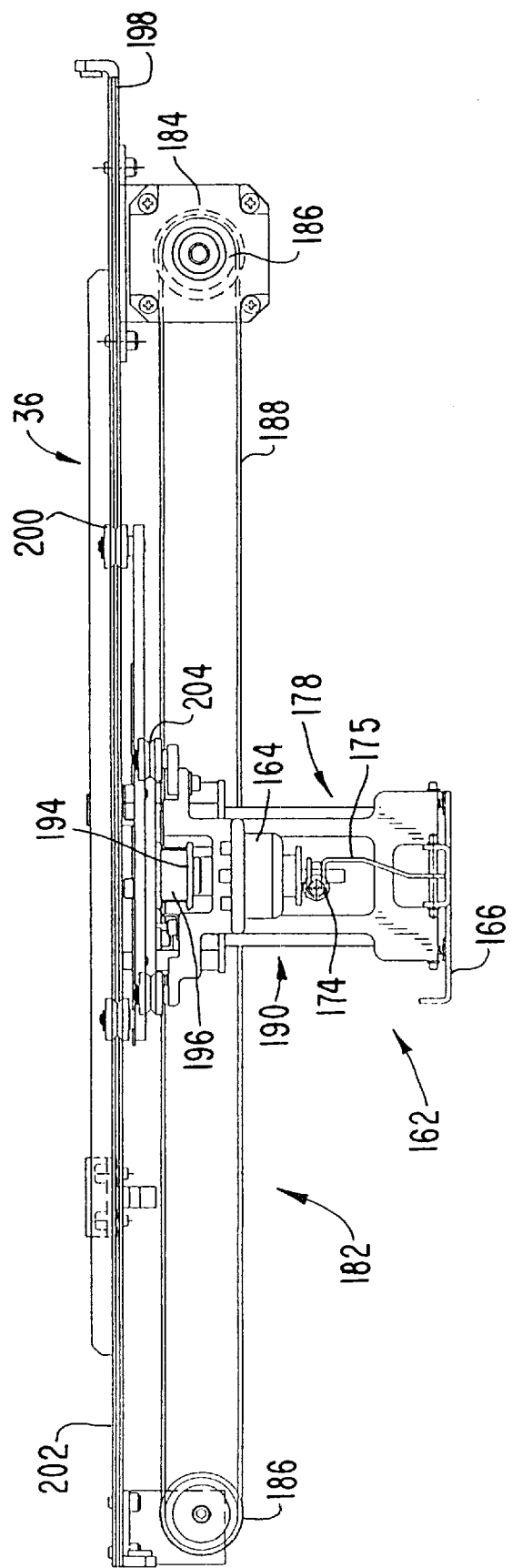
Figure 12A:
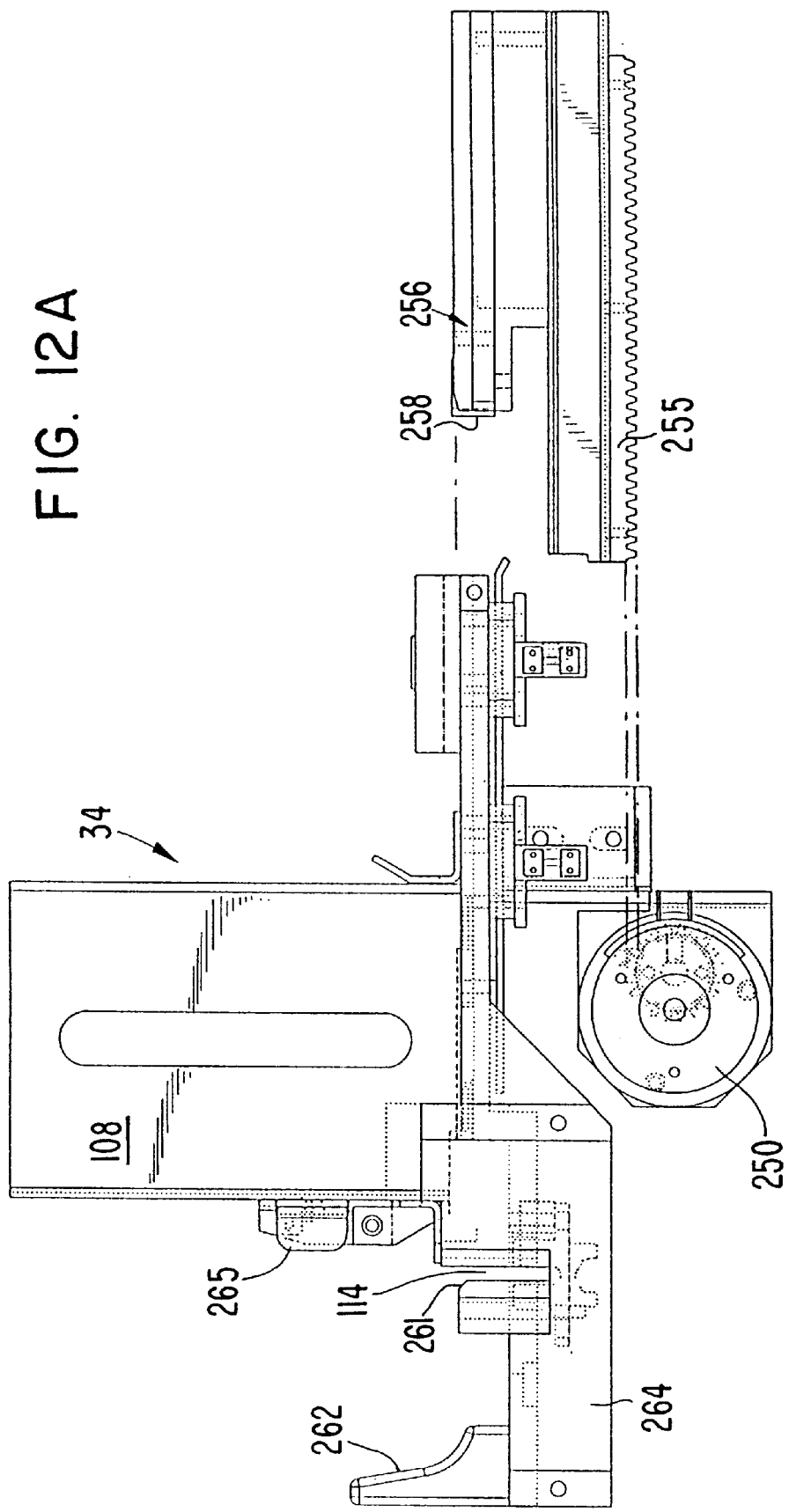
Figure 12C:
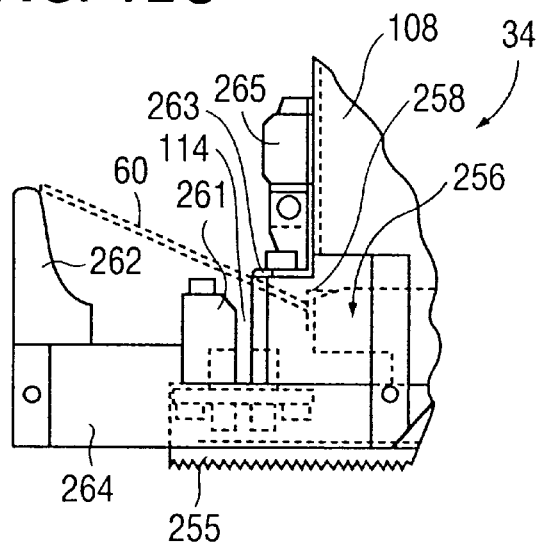
Figure 12D:
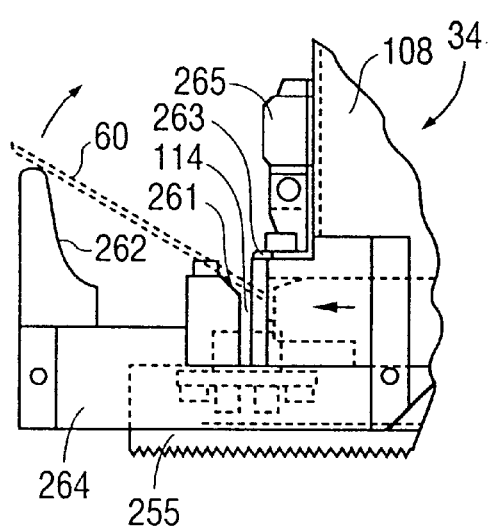
Figure 12E:
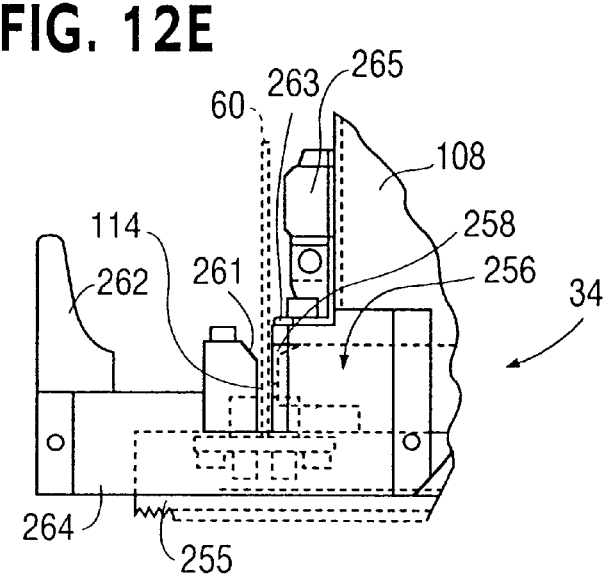
Figure 14:
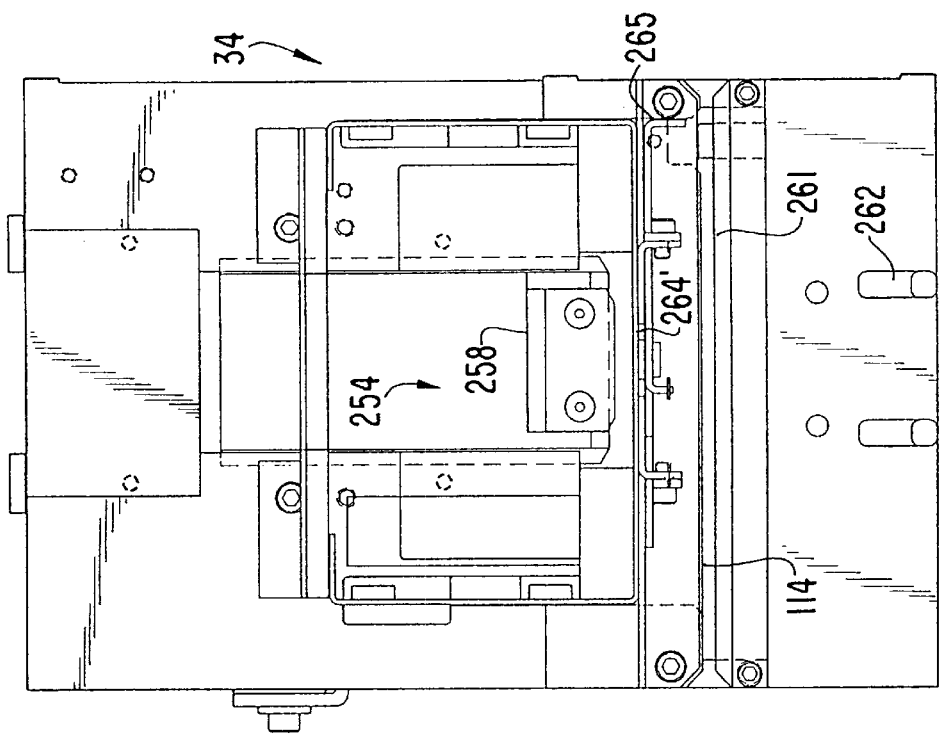
Figure 13:
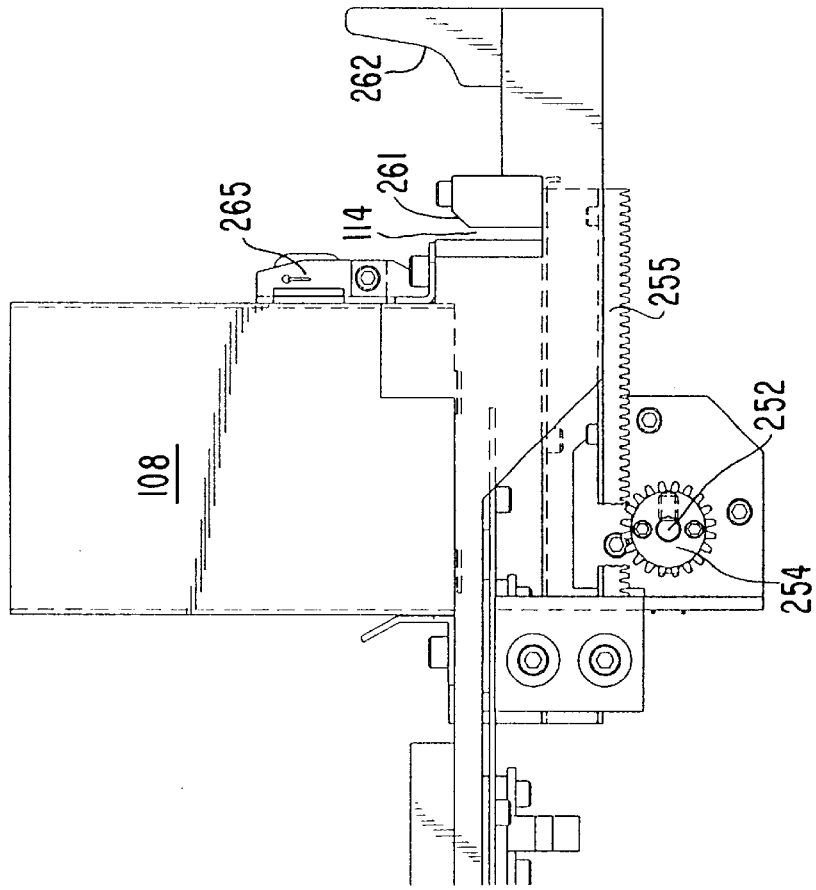
Figure 16:
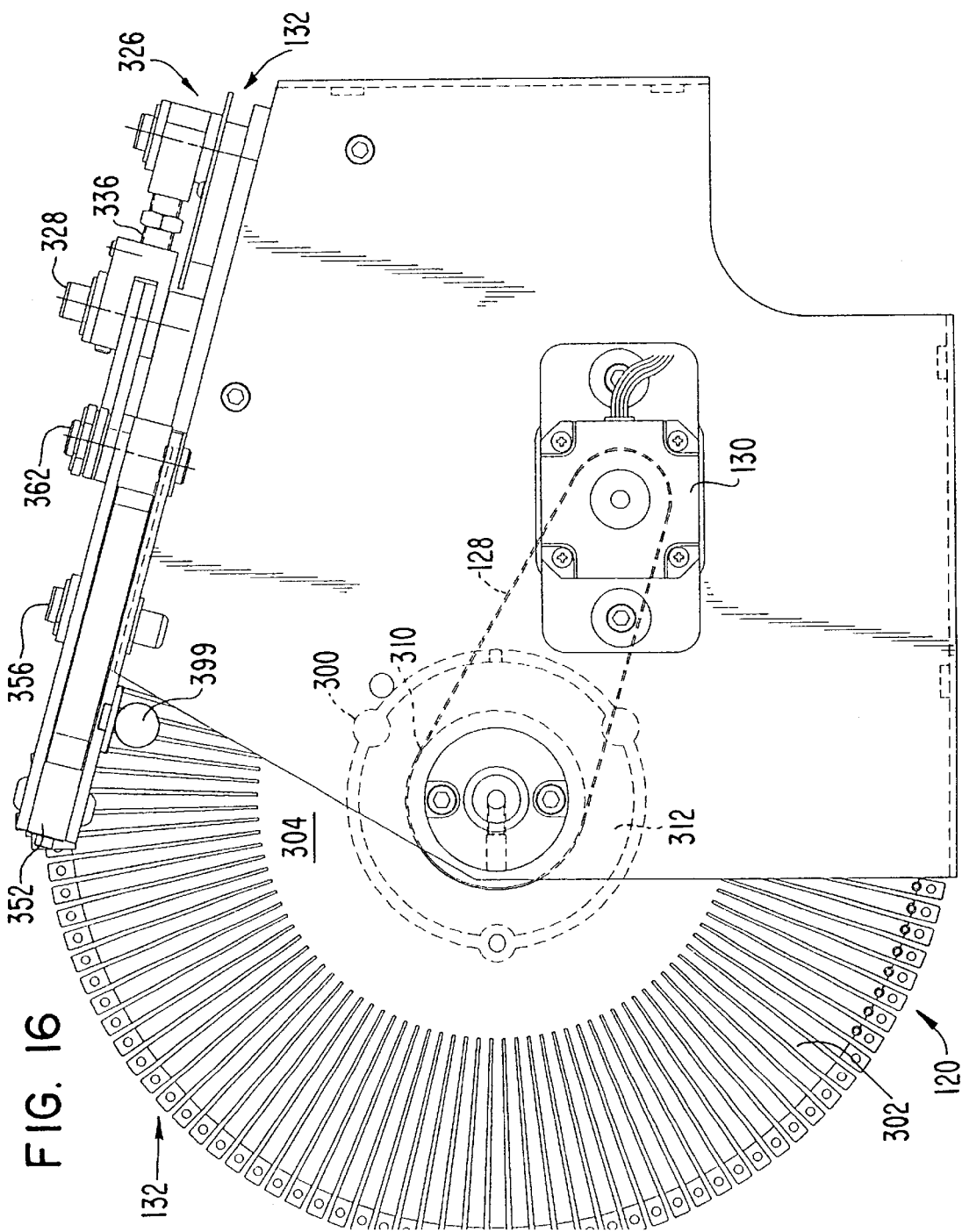

FIGS. 8–10 illustrate an embodiment of the carriage and carriage transport 36 used with the present invention. The carriage 162 contains clamp 116 activated by solenoid 164 which is controlled by the controller 32. The solenoid 160 when activated, pivots jaw 166 outward in a counterclockwise direction as indicated by the arrow to open nip 168 to clamp a card as illustrated in FIG. 5. The pivotable jaw 166 is spring biased into a closed position by spring 170 and pivots about pivot point 172. Wire 175 is attached to screw 174 which is clamped to extensible member 176 of the solenoid 164 to rotate the pivotable jaw 166 about pivot point 172. A carriage frame 178 connects the carriage 162 to the carriage transport 180. The carriage transport 180 moves the carriage 162 through the complete programmable transport path 52 as described above in conjunction with FIG. 3. X and Y coordinates define the transport path segments under the control of the controller 32.

The carriage transport 180 is comprised of an X axis translating mechanism 182 including a stepping motor 184, a pair of pulleys 186 and a belt 188, which drives the carriage 162 through the aforementioned horizontal transport segments and a Y axis translating mechanism 190 including a stepping motor 192, a pair of pulleys 194 and a belt 196, which drives the carriage 162 vertically through the vertical transport path segments.

The carriage transport 180 has a rectangular support frame 198 which is located in a vertical plane which is parallel to the vertical plane in which the card 60 is transported by the carriage 162. The Y axis translating mechanism 190 is rotatably supported by wheels 200 to provide movement along opposed parallel horizontal sides 202 of the rectangular support frame 198. Similarly, wheels 204 support the movement of the carriage 162 along opposed parallel vertical sides 206 of the Y axis translating mechanism 190. An X axis flag 208 provides for sensing of a reference position of the carriage 162 by an X axis sensor 210 and a Y axis flag 212 provides for sensing of a Y axis position of the carriage by a Y axis sensor 214.

The overall operation of the carriage 162 is to perform the function of gripping a card 60 in the nip 168 in response to opening of the jaws 166 by activation of the clamp 116 by activating clamp solenoid 164. Thereafter, when a card 60 is clamped by closing of the movable jaw 168, the combination of activation of the X axis stepping motor 184 and the Y axis stepping motor 192 under the control of the controller 32 causes the carriage 162 to be moved to programmable positions along the X and Y axis as indicated in FIG. 10 to cause the carriage to move along the transport path segments illustrated in FIG. 3.

FIGS. 11–14 illustrate an embodiment of the picker 34 used with the present invention. The picker 34 functions to remove individual cards 60 from the bottom of the stack of cards 62 illustrated in FIG. 3 and to position the individual cards in a vertically upward manner in slot 114 where each card is gripped and held by the pivotable jaw 166 of the carriage 162 as described above. The picker is driven by a gear motor 250 which is controlled by controller 32. The output shaft 252 drives a gear 254 which provides reciprocal motion of the rack 255 which drives the picking member 256 from an initial position at which the left-hand edge 258 of the picking member is just to the right of the right-hand edge of the bottom card 60 of the stack 62 to the left through the gate 257. The removable tray 108 and the curved card flipping surface 262 are fixed in position. When the picking cycle begins, the left-hand edge 258 of the picking member 256 engages the bottom card (not illustrated) in the stack 62 of FIG. 3. As the rack 255 moves to the left, as illustrated by the sequence of events in FIGS. 12B–E, the card is forced outward through the card gate 257 where it first engages surface 261, then engages the pair of curved card flipping surfaces 262 and then engages the bottom surface of bracket 263 as illustrated in FIG. 12C causing the card to snap downward as illustrated in FIG. 12D, while the card rides vertically upward over the top of the card flipping surface 262 as illustrated in FIG. 12D and finally drops in card slot 114 as indicated in FIG. 12E where the card is positioned for subsequent clamping in the nip 168.

Removal of the card tray 108 is produced with reference to FIG. 11 by pulling the removable tray 108 to the right relative to FIG. 11 to clear opening 264 in the latch member 265 permitting upward lifting of the tray 108 above opening 264' sufficient to provide clearance to remove the tray.

FIGS. 15–19 illustrate the embosser wheels 120 and 122 and embosser drive mechanism 132 for activating individual pairs of male and female dies 304 to emboss a character or a male indent character and a corresponding female flat surface 306 carried by the embosser wheels to indent imprint a character. The mechanism for pivoting the ribbon used for marking indent imprints into a credit card is described below with reference to FIGS. 20–24. The pair of plastic molded rotatably mounted embosser wheels 120 and 122 are fixed circumferentially relative to each other by a plurality of screws 300. Each wheel 120 and 122 has radially projecting fingers 302 which are molded to a central hub flange 312. The central hub flanges 312 are fixed relative to each other by the aforementioned screws 300. The individual fingers 302 are springy and may be inwardly deflected toward contact with each other from an offset position to perform embossing. The offset position permits a card 60 to be located between corresponding pairs of fingers 302 for embossing or indent imprinting of a character at a programmed card location which is under the control of controller 32. The programmed locations reproduce the lines of embossed and indent imprinted characters of FIGS. 1A and B. The molded plastic dies 304 are corresponding male and female dies which emboss a raised character which projects inward from the back surface of the card and outward from the front surface of the card in accordance with conventional practice. However, the dies 306 are indent imprint characters or special embossing characters which are metallic. The dies 306 are attached to the radially projecting fingers by attachments through holes 308. In the case of indent imprinting of characters, a male character is used to indent into the face of the card and a corresponding flat anvil surface, carried by the other of the wheels 120 and 122, supports the penetration of the male character into the face of the credit card and helps to prevent deformation of the opposed surface. If special characters are to be embossed, they are attached to corresponding fingers 302 of the wheels 120 and 122 as male and female dies 306 which function in the same manner as the plastic dies 304. The dies 306 are metallic to provide structure which is strong and easily mounted to the end of the radially projecting fingers 302 with suitable attachments, such as the screws. The stepping motor 130, which is under the control of controller 32, drives a belt 128 which drives a pulley 310 attached between the hub flanges 312 of the wheels 120 and 122. The controller 32, during embossing or indent imprinting, commands the stepping motor 130 to move to a specified circumferential position which locates a corresponding pair of dies 304 for embossing or a male character and a flat surface 306 for indent imprinting a character at a position at which rams 314 are driven by embosser drive mechanism 132 from a first withdrawn position to a second extended position. The extended position causes the pairs of male-female dies 304 or an indent imprint die and a flat surface 306 to contact the credit card front and back surfaces to emboss a character or indent imprint a character. The rams 314 are biased by springs 316 to a position which positions the rams inward within ram block 318 relative to opening 320. The card during embossing or indent imprinting is held by the carriage 162 at a position at which an individual character or indent imprint character is to be formed on the card when the embosser drive is activated as discussed below in conjunction with FIGS. 35–38.

Figure 17:
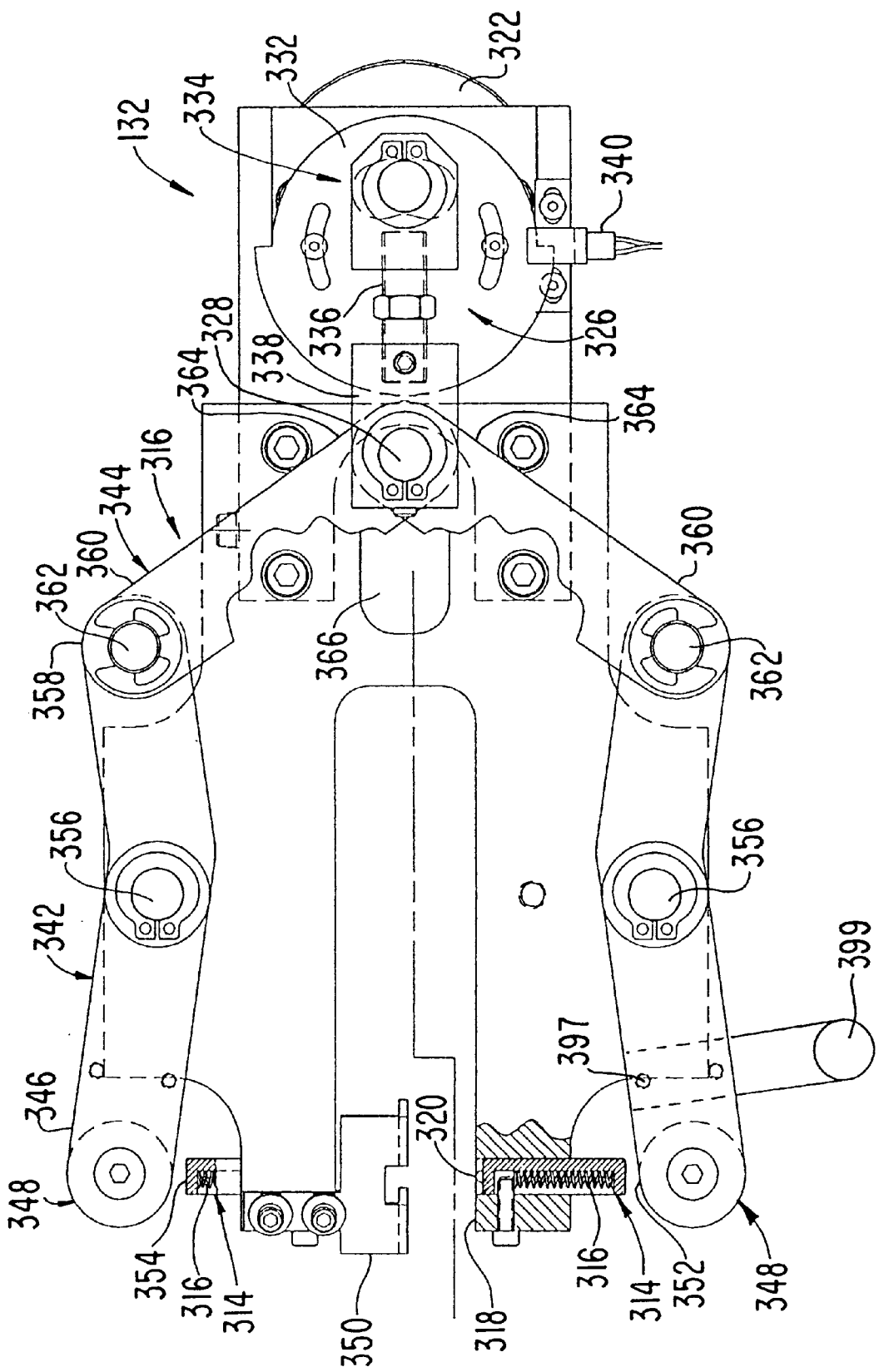

The embosser drive 132 supplies the reciprocal motion for causing the rams 314 to reciprocate from their first withdrawn position as illustrated in FIG. 17 to their extended position which forces opposed pairs of dies 304 or 306 inward into contact with the front and back surface of the card 60 to perform embossing or imprinting. The embosser drive 132 includes a gear motor 322 which supplies the power for embossing. The gear motor 322 has a drive shaft 324 which drives an eccentric drive mechanism 326 which functions like a crank shaft to produce reciprocal motion which causes a drive point 328 to reciprocate. The eccentric drive mechanism 326 includes a crank mechanism which rotates plate 332. A crank and pin assembly 334, offset from the axis of rotation of plate 322, drives a connecting rod 336 which is attached to end link 338 which contains the drive point 328. Sensor 340 senses the home position of the eccentric drive mechanism 326 to signal the controller 30 of the position of the embosser drive.

The rams 314 are driven through reciprocal motion of the drive point 328 through a first pair of pivotable links 342 and a second pair of pivotable links 344. Each of the first pair of pivotable links 342 have a first end 346 which is attached a rotatable cylindrical drive member 348 which engages the rams 314. Support bracket 350 supports the front side of the card against forces produced by penetration of the male characters from the wheel 120 for either embossing or indent imprinting. The outer cylindrical surface 352 of the rotatable cylindrical drive member 348 contacts the end 354 of the rams 314 when the end 346 is pivoted from its withdrawn position to its extended position.

The first pair of pivotable links 342 is pivoted about pivot axis 356. The second end 358 is pivotably attached to a first end 360 of the second pair of pivotable links 344 at pivot point 362. The second ends 364 of the second pair of pivotable links are pivotably attached together at drive point 328.

Reciprocal motion of the drive point 328 within slot 366 causes the first pair of pivotable links 342 to pivot about pivot axis 356 which causes the first ends 346 of the first pair of pivotable links 342 to reciprocate from their withdrawn position to their extended position. This reciprocal motion causes the corresponding movement of the pair of rams 314 to move from first withdrawn position to the second extended position at which embossing or indent imprinting occurs.

FIGS. 20–24 illustrate the structure of the embosser and indent imprinter 38 which is required to perform indent imprinting. Indent imprinting, unlike embossing, requires the positioning of a marking ribbon 380 between the male die and the surface of the credit card which is to be indent imprinted in order to make the indent imprint visible. The positioning of the marking ribbon 380 during indent imprinting is further discussed below with reference to FIGS. 37 and 38. An indent imprint assembly 370 pivots about pivot point 372 to a deployed position as illustrated in FIGS. 20, 21, 23 and 24 from the withdrawn position as illustrated in phantom in FIG. 6. The rotation of the indent imprint assembly 370 from the withdrawn position to the deployed position is approximately 90°. Gear motor 374, under the control of controller 32, controls the deployment of the indent imprint assembly 370 as illustrated in FIGS. 20, 21, 23 and 24 at which indent imprinting occurs.

A stop 390 in the form of a washer and attachment member is attached to the side frame 391 of the embosser. A pair of sensors 393 and 393' sense when the indent imprint assembly 370 has pivoted under drive from motor 374 to either the withdrawn or the deployed positions as respectively illustrated in phantom in FIG. 6 and in FIGS. 20, 21, 23 and 24.

A projection 395 is attached to the side of the indent imprint assembly 142. The projection 395 upon every reciprocal stroke of the embosser drive 302 is engaged by a follower 399 attached to one of the first pair of pivotable links by attachments extending through holes 397. Movement of the follower unwinds new indent imprint ribbon 380 after each indent character is imprinted.

As illustrated in FIG. 22, a pivotable latch 399' permits removal of the marking ribbon supply and take up rolls 382 and 384 for replenishment of the ribbon 380 which is consumed during indent imprinting and should be removed for security purposes during times when the embossing system is inactive or in an area where access is not restricted to only authorized personnel. A reflective sensor (not illustrated) is positioned next to the marking ribbon 380 to signal the controller 32 when the supply of marking ribbon 380 requires replenishment. The ribbon 380 is supplied from the supply reel 382 to the take up reel 384 via idler rollers 386. The follower 395 is clamped by a clamp 401 to the axis of rotation 403 of take up reel 384 so that each reciprocal stroke of the pivotable link 342 causes the follower 399 to move the projection 395 which causes the advancing of new marking ribbon 380 from the supply reel 382 to a position where indent imprinting occurs.

The shaft 388 of the gear motor 374 is attached to the embosser wheel assembly 389. The casing 389' is attached to the plate 376. As a result, activation of the gear motor 374 causes the rotation of the whole indent imprinter assembly 370 about pivot point 372 from the withdrawn position as illustrated in phantom in FIG. 6 to the deployed position as illustrated in FIGS. 20, 21, 23 and 24.

Figure 25:
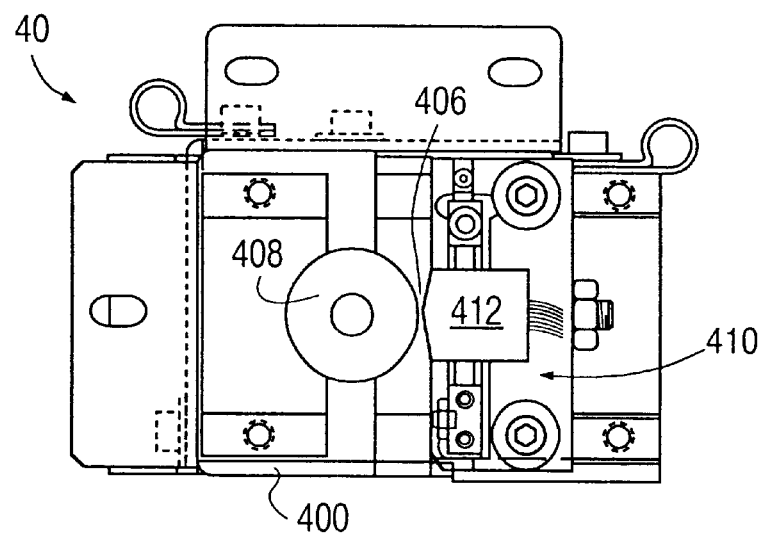
FIGS. 25 and 26 illustrate an embodiment of the magnetic encoder used with the practice of the present invention with FIG. 25 being a top plan view and FIG. 26 being a side elevational view.
Figure 26:
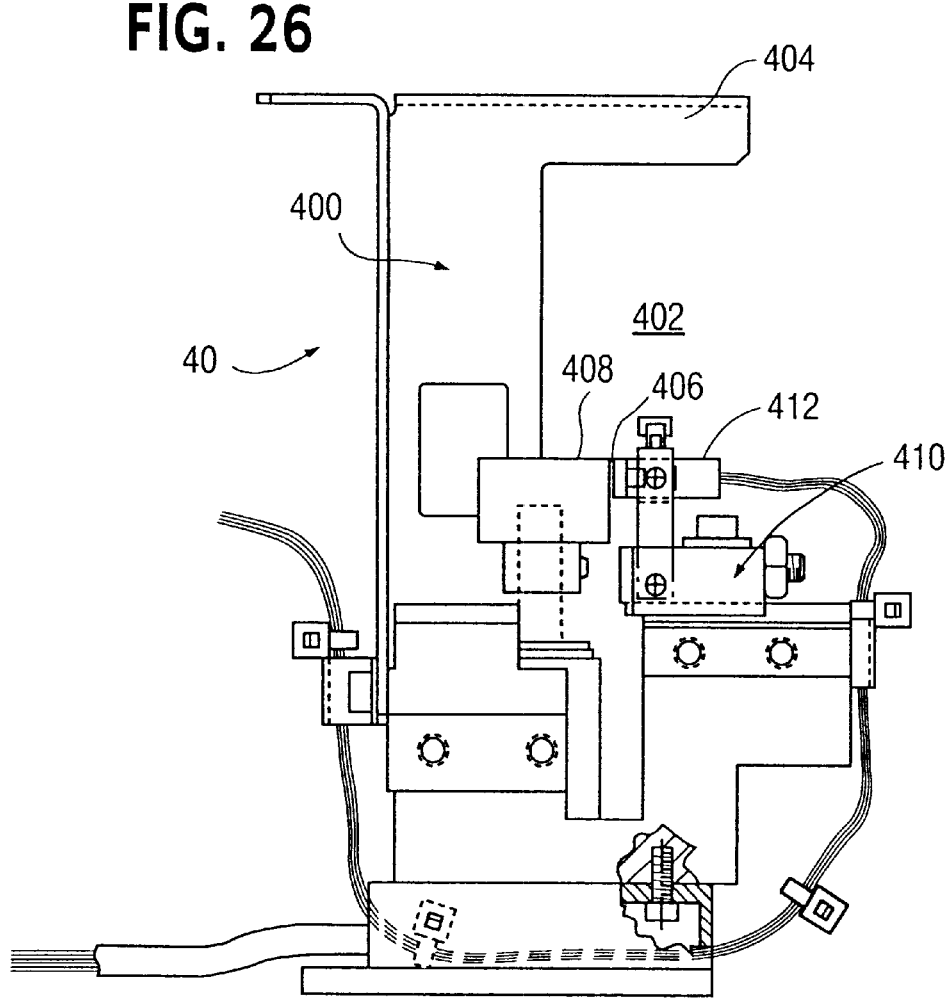
Figure 27:
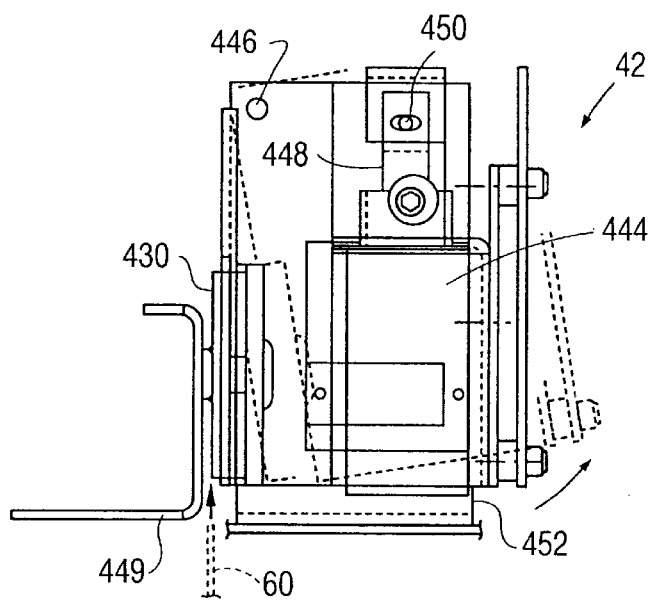
FIGS. 27–31 illustrate an embodiment of a smart card encoder used with the practice of the present invention with FIG. 27 being a top plan view, FIG. 28 being a side elevational view, FIG. 29 being a rear elevational view, FIG. 30 being a partial view of the electrical contractor which contacts the external contacts of a smart card of FIG. 1
Figure 28:
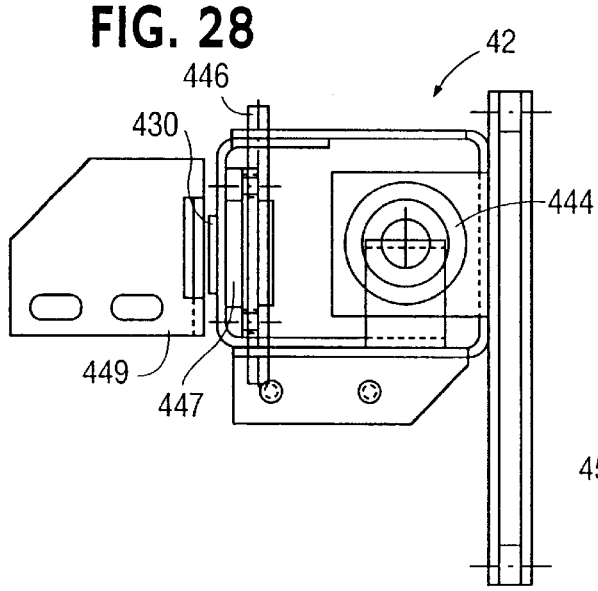
Figure 29:
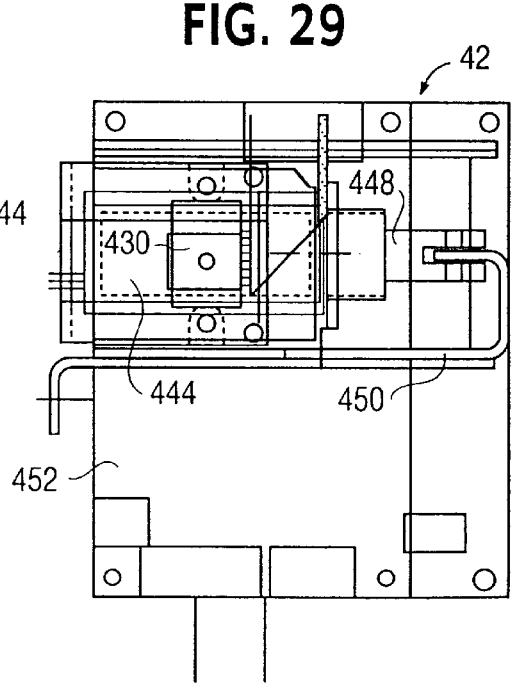
Figure 30:
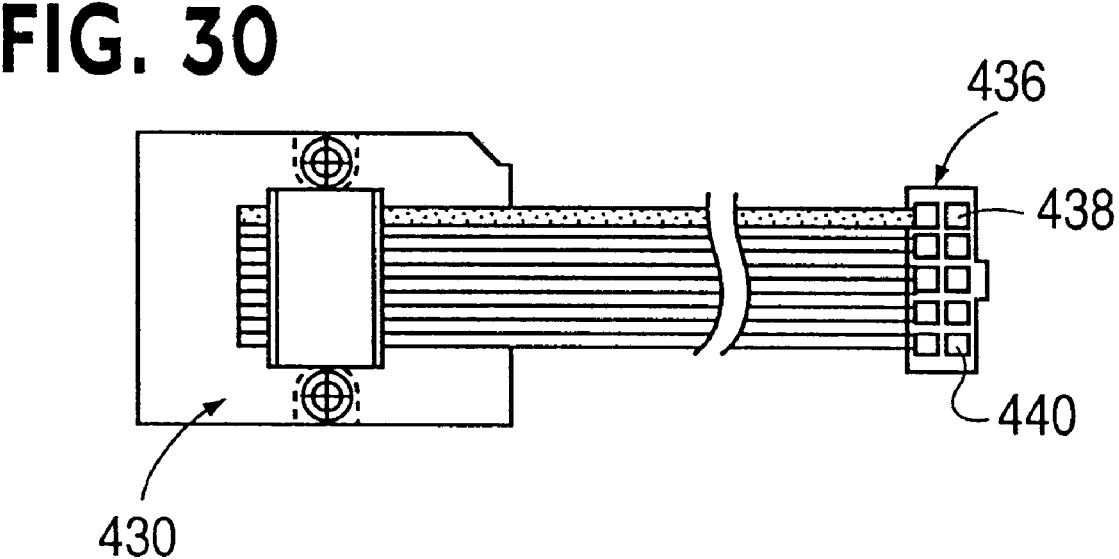
Figure 31:
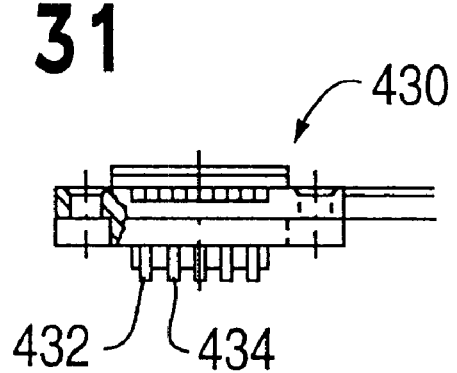

FIGS. 25 and 26 illustrate an embodiment of the magnetic encoder 40 which is used with the practice of the present invention. The magnetic encoder 40 has a vertical frame 400 which is attached to the chassis of the embossing system. An opening 402 below a cantilevered portion 404 of the frame 400 provides sufficient clearance to permit the carriage 162 to pass along the upper horizontal transport path 54 between nip 406, located between a drum assembly 408 and a head and yoke assembly 410, which has a magnetic recording and reading head 412. The carriage 162, as described above with respect to FIG. 3, traverses the card 60 with the magnetic media 20 located in the gap defined by the head and drum assembly facing the magnetic head to record individual tracks (which are typically three in number) and after recording each track traverses the carriage back to read the recorded track to make sure that all recorded information is correct. The controller 32 controls the overall recording process and the reading back to determine if all tracks are properly recorded. If the card is not properly recorded after reading back the recorded track after a number of recording attempts, the card is further processed by the embossing system as a reject.

FIGS. 27–31 illustrate an embodiment of the smart card encoder 42 which is used with the present invention. The smart card encoder 42 may be the smart card encoder used in the Assignee's Horizon™ credit card embosser. The smart card encoder is pivoted between an open position, as illustrated in phantom in FIG. 27, which permits the carriage 162 to position a card 60 for recording of the integrated circuit in the smart card, and a closed position as illustrated which provides an electrical contact between the electrical contacts illustrated in the prior art credit card of FIG. 1A and a corresponding contractor 430 which has eight contacts through which programming information is inputted under the control of controller 32 to program the integrated circuit memory contained in the credit card. A corresponding electrical connector 436 (illustrated in FIG. 30) is plugged into a socket (not illustrated) providing electrical connections to the controller 32. The top two lines 438 are not used. The bottom eight lines 440 input information from electrical circuits which are driven by the controller 32. From the top to bottom, the left-hand lines are VCC, RST, CLK and (RFU) and from the top to bottom, the right-hand lines are GND, VPP, I/O and (RFU). A ribbon connector 442 connects the contacts 432 and 434 to the plug in connector 436. The solenoid 444 is activated by the controller 32 to cause pivoting of the body of the smart card encoder about pivot axis 446 between the closed position as illustrated and the open position as illustrated in phantom. A sensing switch 447 signals the controller 32 when the smart card encoder 42 is closed on a card. Closing of the sensing switch 447 is produced by the pressure produced by contact with contractor 430 against the credit card which is supported against support 449. The solenoid output 448 extends vertically upward in FIG. 27 to cause connector 450 to pivot the body of the smart card encoder 46 carrying the solenoid 444 to the open position about pivot point 446. The connector 450 is coupled to frame member 452 through which the force produced by extension and retraction of solenoid output 448 acts to pivot the smart card encoder body into the open position and to pivot the smart card encoder body to the closed position to produce electrical contact between the contacts of the card 60 being encoded and the corresponding contacts 434 of the contractor 430 which is electrically connected to the controller 32.

Figure 32:
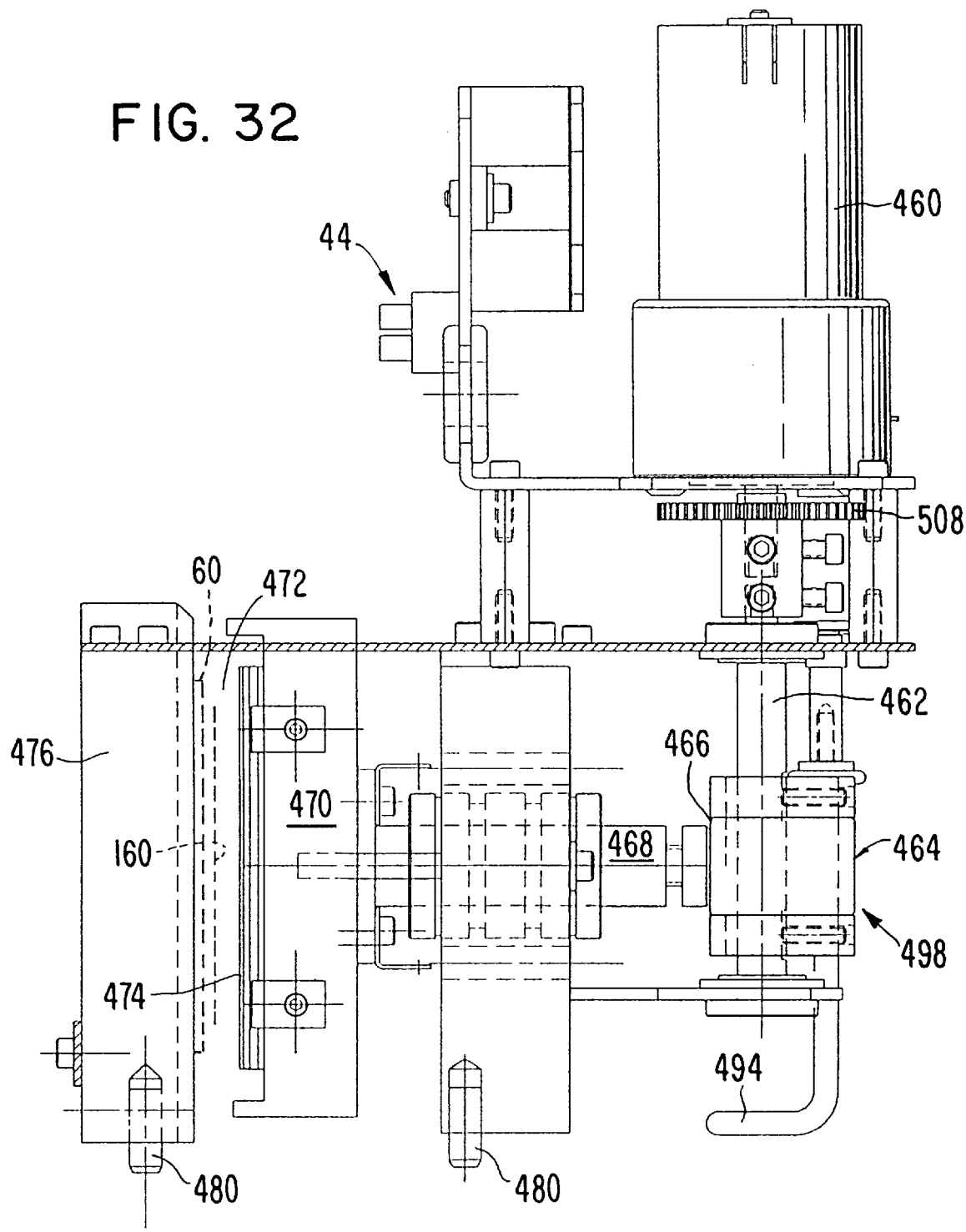
Figure 34A:
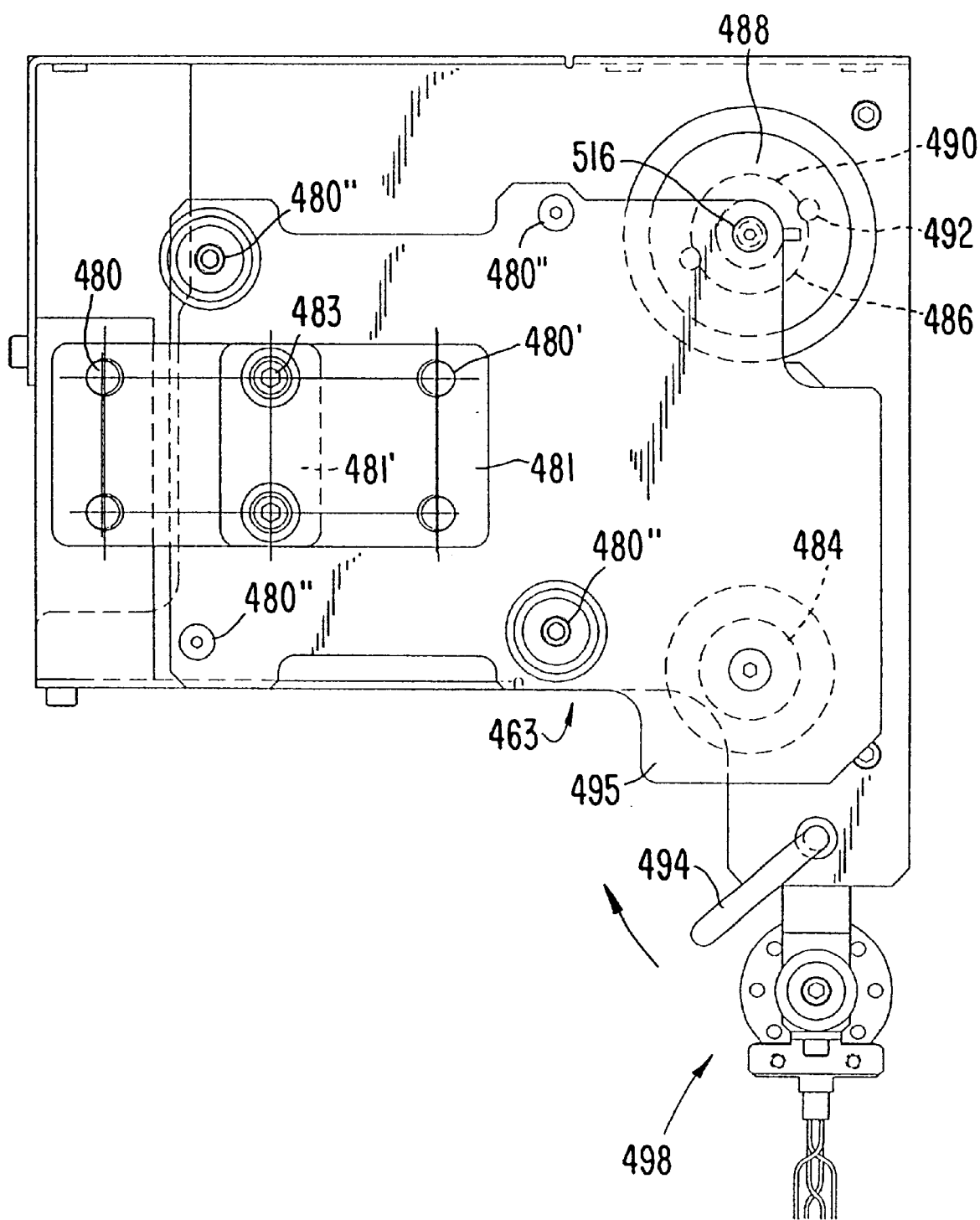
Figure 34B:
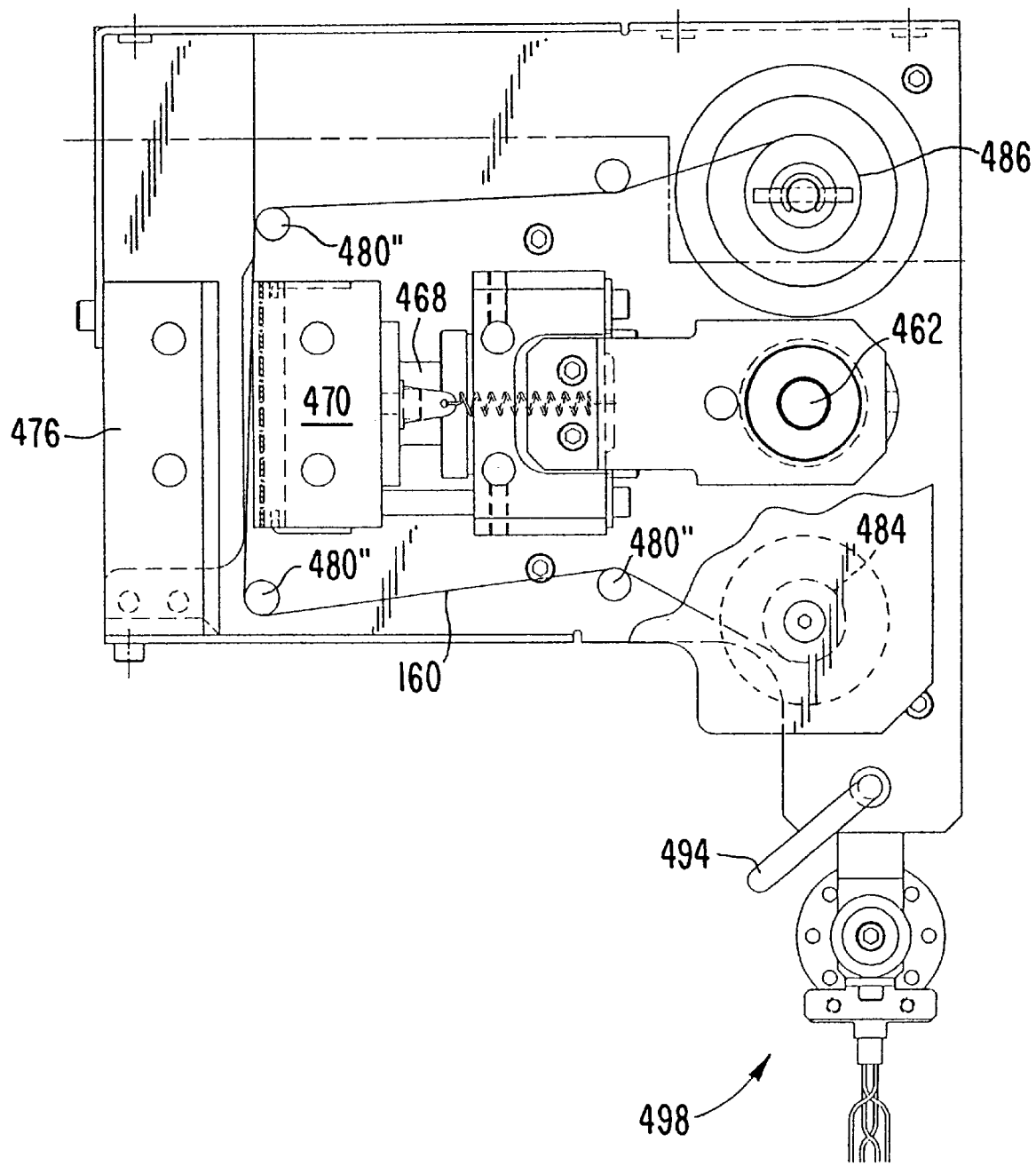

FIGS. 32–34 illustrate an embodiment of a tipper 44 used with the practice of the present invention. The tipper 44 is powered by a gear motor 460 which has a substantially reduced geared down output which is controlled by the controller 32 and is controlled to rotate through less than 180°. The tipper 44 performs the function of applying a highlighting foil to the raised embossed characters 304 produced by the embosser of the embosser and indent imprinter 38. A removable cassette 463 may be used to supply tipping foil 160 in the form of a ribbon wound around take up roller 486 from supply roller 484. The supply roller 484 and the take up roller 486 are carried by the cassette 463. The drive for the take up roller 487 is from shaft 516. The take up roller 486 is advanced during the motor 460 withdrawing the heated platen 470 from contact with the credit card after each tipping operation. The output shaft 462 of the gear motor 460 drives a cam 464 which is mounted eccentrically to the shaft 462. The cam surface 466 pushes a ram 468 which drives the heated platen 470 to the left with respect to FIG. 32 to apply foil 160 to raised embossed characters of a card 60 located within the gap 472. The foil 160 extends through the opening 472 so that it is located between surface 474 of the heated platen 470 and a surface of the credit card 60 having raised embossed characters to be tipped. The anvil 476 also provides a rigid support for the opposite side of the credit card to which tipping is not applied. Four pins 480 received in apertures 480' the cassette 463 relative to plate 481 which is adjustable in position. The plate 481' is clamped with attachments 483 which, when loosened, permit the plate 481 to be adjusted in position to adjust where the cassette 463 attaches to the remainder of the tipper body 485. The four pins 480 provide structural support to resist spreading force caused by the heated platen 470 applying tipping force to the anvil 476. The tipping material 160 (illustrated in FIG. 34B) is guided as it unwinds from the supply roll 484 past pillars 480", to a take up roll 486. A cap 488 is forced down onto post 490. A pair of rods 492 downwardly dependent from the cap 488, after the initial wrapping of tipping material 160 around the outside periphery of take up roll 486, capture the tipping material tightly between the outside periphery of the take up roll and the downwardly projecting rods 492.

Lever 494, illustrated in FIG. 33, is spring biased by spring 496 to hold a tipping material sensor 498 into the page to bias rubber O-ring 500 against the tipping material 160 to sense its presence when it moves. When the tipper 44 is in use, the lever 494, when positioned as illustrated in FIG. 32, assumes a position indicated by rotation in the direction indicated by arrow 494 in FIG. 34. The lever 494 extends over and in contact with the lower edge 495 of the cassette front surface to hold the cassette 463 in place while the tipping material sensor 498 is in use. Movement of the tipping material 160, which is caused by a tipping material advancing mechanism described below, produces rotation of shaft 502 which rotates disk 504 which produces a signal which is sensed by sensor 506 informing the controller 32 that foil is present.

Advancement of the tipping material is produced by the reverse movement of the gear motor 460 returning the heated platen 470 to its withdrawn position illustrated in FIG. 32 which is designed to rotate through slightly less than 180° of rotation. The gear motor 460 drives gear 508 which drives gear 510 which rotates shaft 512 inputted into a one-way clutch 514. The output shaft 516 of the one-way clutch drives take up roller 486. The one-way clutch 514, during the forward motion of the heated platen 470 from its withdrawn position to its tipping position does not drive the output shaft 516. However, after the heated platen 470 has reached its fully deployed position at which tipping occurs, after a suitable period of latency to fuse the tipping material to the top of the embossed character, the controller 32 reverses the gear motor 460 which then causes the one-way clutch 514 to drive the take up roller 486 when the heated platen 410 is being retracted from the advanced position at which tipping occurs back to the withdrawn position.

FIGS. 35 and 36 illustrate an enlarged view of embossment of a credit card 60. As illustrated, the first pair of pivotable links 342 are in their withdrawn position. The embosser drive 132, as described above, causes reciprocation of the first pair of pivotable links 342 from their withdrawn position, as illustrated, inward to engage the outer peripheral surface 352 of the cylindrical member 348 with the end 354 of the rams 314 forcing a pair of male and female dies inward to engage the card 60 to cause embossing.

Figure 37:
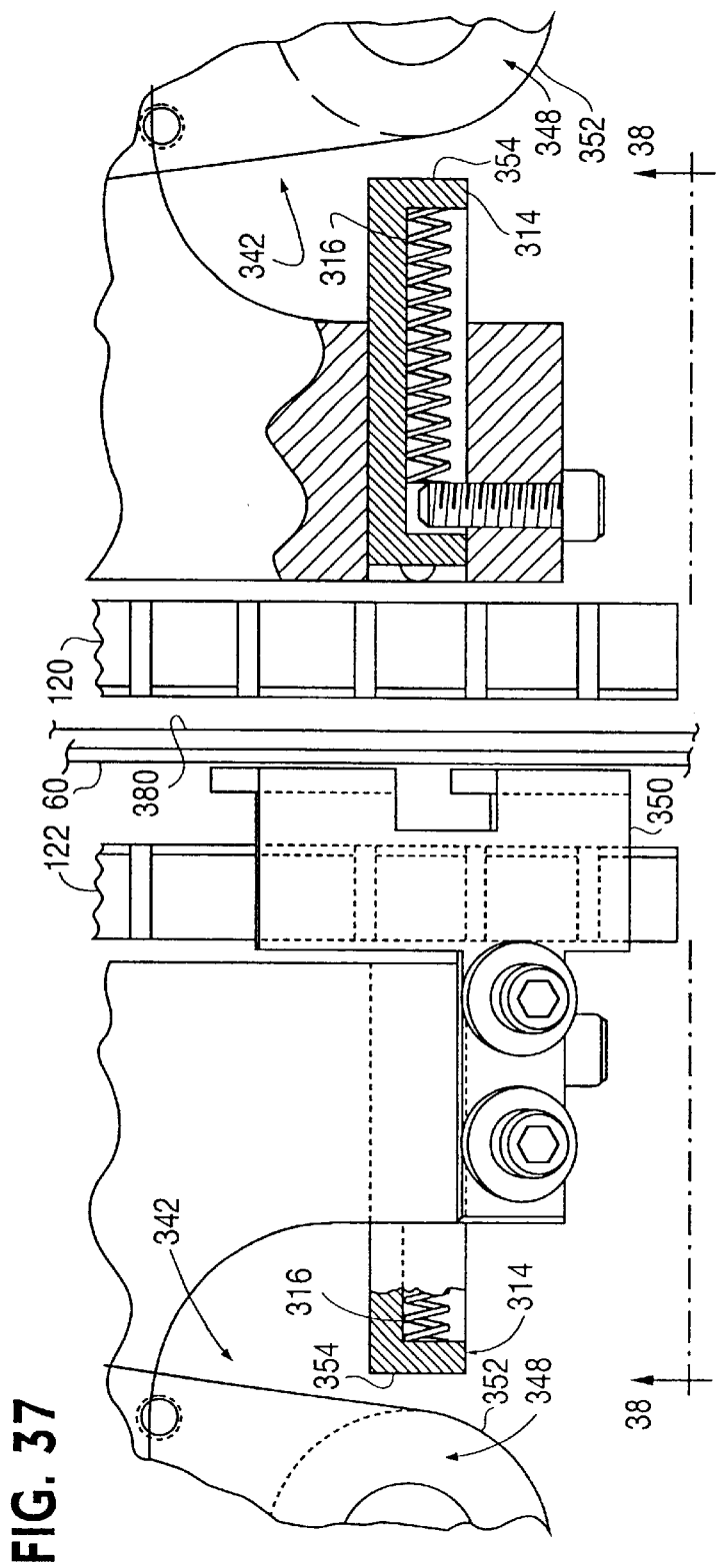
FIGS. 37 and 38 illustrate a view of operation of the embosser during indent imprinting of characters.
Figure 38:
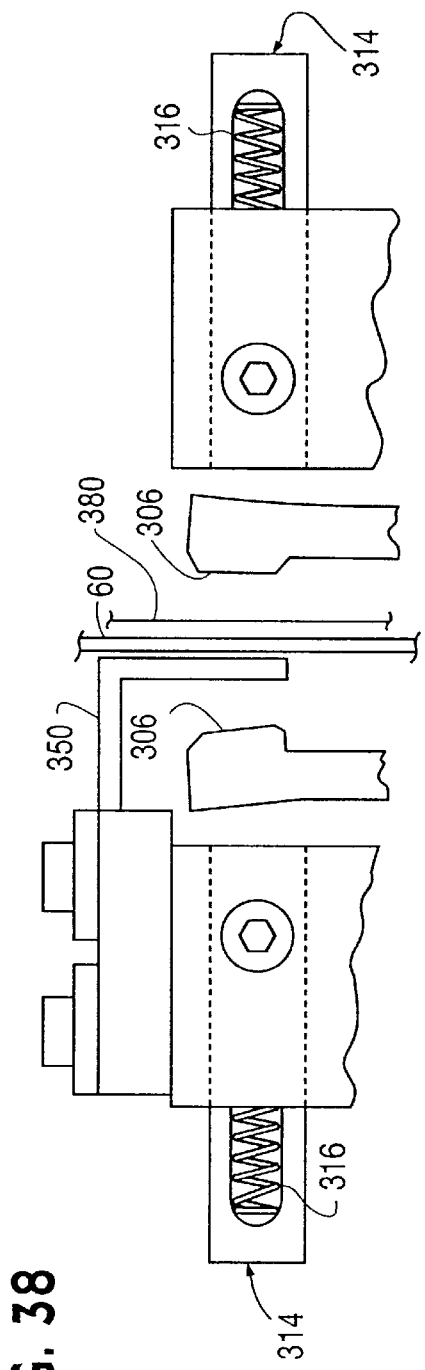

FIGS. 37 and 38 illustrate the indent imprinting of a character onto a credit card 60 which is analogous to the embossing described above with regard to FIGS. 35 and 36 except that the marking ribbon 380 is interposed between the male character 306 and the face of the credit card 60 to be indent imprinted.

While the invention has been described in terms of its preferred embodiments, it should be understood that numerous modifications may be made thereto without departing from the spirit and scope of the invention as defined in the appended claims. It is intended that all such modifications fall within the scope of the appended claims.

What is claimed is:

1. A system comprising:
   a plurality of stations at which processing of an item is performed including an embossing station;
   a carriage for holding the item to be processed by the system at the plurality of stations including the embossing station;

a carriage transport which moves the carriage while holding the item to be processed along a plurality of spaced apart transport paths; and wherein at least one station is disposed at a location on each of the plurality of transport paths and for at least one of the transport paths the carriage transport moves the carriage holding the item to at least one station at which processing of the item is performed and from the location of the at least one station after processing of the item is performed to another station at which processing of the item is performed with a direction of motion along the at least one transport path to the at least one station being opposite to a direction of motion along the at least one transport path from the at least one station.

2. An embossing system in accordance with claim 1 wherein:

the plurality of transport paths are vertically separated and located in a vertical plane.

3. An embossing system in accordance with claim 2 wherein:

each of the plurality of transport paths are horizontal paths.

4. An embossing system in accordance with claim 3 wherein:

the transport paths further comprise at least one vertical transport path connecting the plurality of horizontal transport paths, each vertical transport path joining at least one horizontal transport path between stations located on the at least one horizontal transport path to which each vertical transport path is joined.

5. An embossing system in accordance with claim 4 wherein:

all of the plurality of stations are located on the horizontal transport paths and each vertical transport path joins at least one horizontal transport path at a location between at least one station which is located inboard from another station located on the at least one horizontal transport path to which each vertical transport path is joined.

6. An embossing system in accordance with claim 5 wherein the plurality of stations further comprise:

a magnetic encoding station disposed on one of the plurality of horizontal transport paths for encoding a magnetic media on the item.

7. An embossing system in accordance with claim 6 wherein:

the embossing station is programmable to emboss the item with a plurality of characters which are formed by contact of corresponding pairs of male-female dies against a front and a back surface of the item to emboss at least one line of characters.

8. An embossing system in accordance with claim 7 wherein:

the embossing station further indent imprints the item by contact of pairs of male dies and corresponding flat surfaces respectively against the front and the back surface of the item with a marking ribbon disposed between the male dies and one surface of the item so that the male die drives the ribbon into one surface of the item when the male die contacts the ribbon and the flat surface contacts another surface of the item.

9. An embossing system in accordance with claim 8 wherein:

the embossing station further comprises an assembly carrying the marking ribbon which is pivotably mounted to swing between a withdrawn position at which embossing of the item with the pair of male and female dies is performed and a deployed position which positions the marking ribbon between one of the male dies used for indent imprinting and the surface of the item into which indent imprinting is performed.

10. An embossing system in accordance with claim 6 further comprising:

a tipping station disposed on one of the plurality of horizontal transport paths at which highlighting is applied to raised embossed characters produced by the embossing station.

11. An embossing system in accordance with claim 6 further comprising:

a smart card processing station disposed on one of the plurality of horizontal transport paths for writing information into a memory located within the item.

12. An embossing system in accordance with claim 6 further comprising:

a tipping station disposed on one of the plurality of transport paths at which highlighting is applied to raised embossed characters; and a smart card processing station disposed along one of the plurality of parallel transport paths for writing information into a memory located within the item.

13. An embossing system in accordance with claim 12 wherein:

the embossing station is located on one card transport path and the tipping station, smart card processing station and the station for encoding a magnetic media are located on another card transport path.

14. An embossing system in accordance with claim 4 wherein the plurality of stations further comprise:

a magnetic encoding station disposed on one of the plurality of horizontal transport paths for encoding a magnetic media on the item.

15. An embossing system in accordance with claim 14 wherein:

the embossing station is programmable to emboss the item with a plurality of characters which are formed by contact of corresponding pairs of male-female dies against a front and a back surface of the item to emboss at least one line of characters.

16. An embossing system in accordance with claim 15 wherein:

the embossing station further indent imprints the item by contact of pairs of male dies and corresponding flat surfaces respectively against the front and the back surface of the item with a marking ribbon disposed between the male dies and one surface of the item so that the male die drives the ribbon into one surface of the item when the male die contacts the ribbon and the flat surface contacts another surface of the item.

17. An embossing system in accordance with claim 16 wherein:

the embossing station further comprises an assembly carrying the marking ribbon which is pivotably mounted to swing between a withdrawn position at which embossing of the item with the pair of male and female dies is performed and a deployed position which positions the marking ribbon between one of the male dies used for indent imprinting and the surface of the item into which indent imprinting is performed.

18. An embossing system in accordance with claim 14 further comprising:

a tipping station disposed on one of the plurality of horizontal transport paths at which highlighting is applied to raised embossed characters produced by the embossing station.

19. An embossing system in accordance with claim 14 further comprising:
a smart card processing station disposed on one of the plurality of horizontal transport paths for writing information into a memory located within the item.

20. An embossing system in accordance with claim 14 further comprising:
a tipping station disposed on one of the plurality of transport paths at which highlighting is applied to raised embossed characters; and
a smart card processing station disposed along one of the plurality of transport paths for writing information into a memory located within the item.

21. An embossing system in accordance with claim 20 wherein:
the embossing station is located on one card transport path and the tipping station, smart card processing station and the station for encoding a magnetic media are located on another card transport path.

22. An embossing system in accordance with claim 3 wherein the plurality of stations further comprise:
a magnetic encoding station disposed on one of the plurality transport paths for encoding a magnetic media on the item.

23. An embossing system in accordance with claim 22 wherein:
the embossing station is programmable to emboss the item with a plurality of characters which are formed by contact of corresponding pairs of male-female dies against a front and a back surface of the item to emboss at least one line of characters.

24. An embossing system in accordance with claim 23 wherein:
the embossing station further indent imprints the item by contact of pairs of male dies and a corresponding flat surfaces respectively against the front and the back surface of the item with a marking ribbon disposed between the male dies and one surface of the item so that the male die drives the ribbon into one surface of the item when the male die contacts the ribbon and the flat surface contacts another surface of the item.

25. An embossing system in accordance with claim 24 wherein:
the embossing station further comprises an assembly carrying the marking ribbon which is pivotably mounted to swing between a withdrawn position at which embossing of the item with the pair of male and female dies is performed and a deployed position which positions the marking ribbon between one of the male dies used for indent imprinting and the surface of the item into which indent imprinting is performed.

26. An embossing system in accordance with claim 25 wherein the embossing station further comprises:
a pair of rotatably mounted wheels which are fixed circumferentially relative to each other, each wheel having radially projecting fingers which have dies or flat surfaces mounted at an outer radial end thereof, one of the wheels carrying dies in a form of male characters and another of the wheels carrying female dies in a form of characters or flat surfaces;
a wheel positioning mechanism for rotating the wheels to an embossing position at which individual characters are embossed into the item or at which characters are indent imprinted into the item; and an embosser drive mechanism for driving pairs of male and female dies or male dies and flat surfaces inward into contact with the front and back surface of the item to produce an embossed character or an indent imprinted character; and wherein
the carriage transport moves the item to be embossed and indent imprinted to programmable X,Y coordinates between individual pairs of male and female dies, or a male die and a flat surface to emboss or indent imprint a least one line of characters.

27. An embossing system in accordance with claim 26 wherein the embosser drive mechanism comprises:
a pair of rams which are movable from a first withdrawn position to a second extended position which causes the pairs of male-female dies or an indent imprint die and a flat surface to contact the item to emboss a character or indent imprint a character;
a drive which activates the pair of rows including a first pair of pivotable links which pivot about a pivot axis which respectively pivot between a withdrawn position to an extended position which drive the rams between the first withdrawn position and the second extended position; and a motor, coupled to the first pair of pivotable links, for driving the first pair of pivotable links between the withdrawn and extended positions.

28. An embossing system in accordance with claim 27 wherein the further comprises:
a second pair of pivotable links, one of the second pair of links being pivotably attached to one of the first pair of pivotable links and another of the second pair of pivotable links being attached to another of the first pair of pivotable links, the second pair of pivotable links also being pivotably attached together at a drive point; and
an assembly, coupled to the drive point and to the motor, for reciprocating the drive point between first and second positions which cause the corresponding movement of attachment points of the first and second pairs of links between first and second positions which causes the pair of rams to move between the first withdrawn position and the second extended position.

29. An embossing system in accordance with claim 22 further comprising:
a tipping station disposed on one of the plurality of transport paths at which highlighting is applied to raised embossed characters produced by the embossing station.

30. An embossing system in accordance with claim 22 further comprising:
a smart card processing station disposed on one of the plurality of transport paths for writing information into a memory located within the item.

31. An embossing system in accordance with claim 22 further comprising:
a tipping station disposed on one of the plurality of transport paths at which highlighting is applied to raised embossed characters; and
a smart card processing station disposed along one of the plurality of transport paths for writing information into a memory located within the item.

32. An embossing system in accordance with claim 31 wherein:
the embossing station is located on one card transport path and the tipping station, smart card processing station and the station for encoding a magnetic media are located on another card transport path.

33. An embossing system in accordance with claim 32 wherein:
the plurality of the spaced apart transport paths are disposed parallel to a longitudinal dimension of a housing containing the embossing system; and
a front surface of the housing is attached at an end of the longitudinal dimension of the housing through which an access opening is provided to provide items to be processed by the embossing system.

34. An embossing system in accordance with claim 31 wherein:
the plurality of the spaced apart transport paths are disposed parallel to a longitudinal dimension of a housing containing the embossing system; and
a front surface of the housing is attached at an end of the longitudinal dimension of the housing through which an access opening is provided to provide items to be processed by the embossing system.

35. An embossing system in accordance with claim 3 further comprising:
a supply station for containing a stack of items to be processed; and
a picking mechanism for picking individual items from the stack and conveying an individual picked item to a position along one of the spaced apart transport paths for holding by the carriage.

36. An embossing system in accordance with claim 2 wherein the plurality of stations further comprise:
a magnetic encoding station disposed on one of the plurality transport paths for encoding a magnetic media on the item.

37. An embossing system in accordance with claim 36 wherein:
the embossing station is programmable to emboss the item with a plurality of characters which are formed by contact of corresponding pairs of male-female dies against a front and back surface of the item to emboss at least one line of characters.

38. An embossing system in accordance with claim 37 wherein:
the embossing station further indent imprints the item by contact of pairs of male dies and corresponding flat surfaces respectively against the front and the back surface of the item with a marking ribbon disposed between the male dies and one surface of the item so that the male die drives the ribbon into one surface of the item when the male die contacts the ribbon and the flat surface contacts another surface of the item.

39. An embossing system in accordance with claim 38 wherein:
the embossing station further comprises an assembly carrying the marking ribbon which is pivotably mounted to swing between a withdrawn position at which embossing of the item with the pair of male and female dies is performed and a deployed position which positions the marking ribbon between one of the male dies used for indent imprinting and the surface of the item into which indent imprinting is performed.

40. An embossing system in accordance with claim 38 wherein the embossing station further comprises:
a pair of rotatably mounted wheels which are fixed circumferentially relative to each other, each wheel having radially projecting fingers which have dies or flat surfaces mounted at an outer radial end thereof, one of the wheels carrying dies in a form of male characters and another of the wheels carrying female dies in a form of characters or flat surfaces;
a wheel positioning mechanism for rotating the wheels to an embossing position at which individual characters are embossed into the item or at which characters are indent imprinted into the item; and
an embosser drive mechanism for driving pairs of male and female dies or male dies and flat surfaces inward into contact with the front and back surface of the item to produce an embossed character or an indent imprinted character; and wherein
the carriage transport moves the item to be embossed and indent imprinted to programmable X,Y coordinates between individual pairs of male and female dies, or a male die and a flat surface to emboss or indent imprint a least one line of characters.

41. An embossing system in accordance with claim 40 wherein the embosser drive mechanism comprises:
a pair of rams which are movable from a first withdrawn position to a second extended position which causes the pairs of male-female dies or an indent imprint die and a flat surface to contact the item to emboss a character or indent imprint a character; and
a drive which activates the pair of rows including a first pair of pivotable links which pivot about a pivot axis which respectively pivot between a withdrawn position to an extended position which drive the rams between the first withdrawn position and the second extended position; and a motor, coupled to the first pair of pivotable links, for driving the first pair of pivotable links between the withdrawn and extended positions.

42. An embossing system in accordance with claim 41 wherein the embosser drive mechanism further comprises:
a second pair of pivotable links, one of the second pair of links being pivotably attached to one of the first pair of pivotable links and another of the second pair of pivotable links being attached to another of the first pair of pivotable links, the second pair of pivotable links also being pivotably attached together at a drive point; and
an assembly, coupled to the drive point and to the motor, for reciprocating the drive point between first and second positions which cause the corresponding movement of attachment points of the first and second pairs of links between first and second positions which causes the pair of rams to move between the first withdrawn position and the second extended position.

43. An embossing system in accordance with claim 36 further comprising:
a tipping station disposed on one of the plurality of transport paths at which highlighting is applied to raised embossed characters produced by the embossing station.

44. An embossing system in accordance with claim 36 further comprising:
a smart card processing station disposed on one of the plurality of transport paths for writing information into a memory located within the item.

45. An embossing system in accordance with claim 36 further comprising:
a tipping station disposed on one of the plurality of transport paths at which highlighting is applied to raised embossed characters; and
a smart card processing station disposed along one of the plurality of transport paths for writing information into a memory located within the item.

46. An embossing system in accordance with claim 45 wherein:
the embossing station is located on one card transport path and the tipping station, smart card processing station and the station for encoding a magnetic media are located on another card transport path.

47. An embossing system in accordance with claim 2 further comprising:
a supply station for containing a stack of items to be processed; and
a picking mechanism for picking individual items from the stack and conveying an individual picked item to a position along one of the spaced apart transport paths for holding-by the carriage.

48. An embossing system in accordance with claim 47 wherein:
a surface of the item which is to be embossed is horizontally disposed when the individual items are in the stack; and
the picking mechanism removes an item in the stack which is located in a horizontal plane and rotates the individual item from the horizontal plane to a vertical plane in which the carriage holds the item for processing by the plurality of stations including the embossing station.

49. An embossing system in accordance with claim 47 wherein:
a surface of the item which is to be embossed is horizontally disposed when the individual items are in the stack; and
the picking mechanism removes an item in the stack which is located in a horizontal plane and rotates the individual item from the horizontal plane to a vertical plane in which the carriage holds the item for processing by the plurality of stations including the embossing station.

50. An embossing system in accordance with claim 1 wherein the plurality of stations further comprise:
a magnetic encoding station disposed on one of the plurality of transport paths for encoding a magnetic media on the item.

51. An embossing system in accordance with claim 50 wherein:
the embossing station is programmable to emboss the item with a plurality of characters which are formed by contact of corresponding pairs of male and female dies against a front and a back surface of the item to emboss at least one line of characters.

52. An embossing system in accordance with claim 51 wherein:
the embossing station further indent imprints the item by contact of pairs of male dies and a corresponding flat surfaces respectively against the front and the back surface of the item with a marking ribbon disposed between the male dies and one surface of the item so that the male die drives the ribbon into one surface of the item when the male die contacts the ribbon and the flat surface contacts another surface of the item.

53. An embossing system in accordance with claim 52 wherein the embossing station further comprises:
a pair of rotatably mounted wheels which are fixed circumferentially relative to each other, each wheel having radially projecting fingers which have dies or flat surfaces mounted at an outer radial end thereof, one of the wheels carrying dies in a form of male characters and another of the wheels carrying female dies in a form of characters or flat surfaces;
a wheel positioning mechanism for rotating the wheels to an embossing position at which individual characters are embossed into the item or at which characters are indent imprinted into the item; and
an embosser drive mechanism for driving pairs of male and female dies or male dies and flat surfaces inward into contact with the front and back surface of the item to produce an embossed character or an indent imprinted character; and wherein
the carriage transport moves the item to be embossed and indent imprinted to programmable X,Y coordinates between individual pairs of male and female dies, or a male die and a flat surface to emboss or indent imprint a least one line of characters.

54. An embossing system in accordance with claim 53 wherein the embosser drive mechanism comprises:
a pair of rams which are movable from a first withdrawn position to a second extended position which causes the pairs of male-female dies or an indent imprint die and a flat surface to contact the item to emboss a character or indent imprint a character; and
a drive which activates the pair of rams including a first pair of pivotable links which pivot about a pivot axis which respectively pivot between a withdrawn position to an extended position which drive the rams between the first withdrawn position and the second extended position; and a motor, coupled to the first pair of pivotable links, for driving the first pair of pivotable links between the withdrawn and extended positions.

55. An embossing system in accordance with claim 54 wherein the embosser drive mechanism further comprises:
a second pair of pivotable links, one of the second pair of links being pivotably attached to one of the first pair of pivotable links and another of the second pair of pivotable links being attached to another of the first pair of pivotable links, the second pair of pivotable links also being pivotably attached together at a drive point; and
an assembly, coupled to the drive point and to the motor, for reciprocating the drive point between first and second positions which cause the corresponding movement of attachment points of the first and second pairs of links between first and second positions which causes the pair of rams to move between the first withdrawn position and the second extended position.

56. An embossing system in accordance with claim 52 wherein:
the embossing station further comprises an assembly carrying the marking ribbon which is pivotably mounted to swing between a withdrawn position at which embossing of the item with the pair of male and female dies is performed and a deployed position which positions the marking ribbon between one of the male dies used for indent imprinting and the surface of the item in to which indent imprinting is performed.

57. An embossing system in accordance with claim 56 wherein:
the plurality of the spaced apart transport paths are disposed parallel to a longitudinal dimension of a housing containing the embossing system; and
a front surface of the housing is attached to an end of the longitudinal dimension of the housing through which an access opening is provided through which the assembly is removed.

58. An embossing system in accordance with claim 56 further comprising:
- a tipping station disposed on one of the plurality of transport paths at which highlighting is applied to raised embossed characters; and wherein
- the plurality of spaced apart transport paths are disposed parallel to a longitudinal dimension of the housing containing the embossing system; and
- a front surface of the housing is attached at an end of the housing through which a pair of access openings are provided through which the assembly and the tipping station are respectively removed.

59. An embossing system in accordance with claim 50 further comprising:
- a tipping station disposed on one of the plurality of transport paths at which highlighting is applied to raised embossed characters produced by the embossing station.

60. An embossing system in accordance with claim 59 wherein:
- the plurality of spaced apart transport paths are disposed parallel to a longitudinal dimension of a housing containing the embossing system; and
- a front surface of the housing is attached at an end of the longitudinal dimension of the housing through which an access opening is provided through which the tipping station is removed.

61. An embossing system in accordance with claim 50 further comprising:
- a smart card processing station disposed on one of the plurality of transport paths for writing information into a memory located within the item.

62. An embossing system in accordance with claim 52 further comprising:
- a tipping station disposed on one of the plurality of transport paths at which highlighting is applied to raised embossed characters; and
- a smart card processing station disposed on one of the plurality of parallel transport paths for writing information into a memory located within the item.

63. An embossing system in accordance with claim 62 wherein:
- the embossing station is located on one card transport path and the tipping station, smart card processing station and the station for encoding a magnetic media are located on another card transport path.

64. An embossing system in accordance with claim 1 wherein:
- the plurality of the spaced apart transport paths are disposed parallel to a longitudinal dimension of a housing containing the embossing system; and
- a front surface of the housing is attached at an end of the longitudinal dimension of the housing through which an access opening is provided to provide the items to be processed by the embossing system.

65. An embosser comprising:
- a pair of rotatably mounted wheels which are fixed circumferentially relative to each other, each wheel having radially projecting fingers which have characters mounted at an outer radial end thereof, one of the wheels carrying male dies and one of the wheels carrying female dies with pairs of male and female dies being activated to emboss characters;
- a wheel positioning mechanism for rotating the wheels to an embossing position at which individual characters are embossed into an item by activation of a pair of male and a corresponding female die;
- a carriage for holding an item to be embossed with the characters mounted on the outer radial end of the radially projecting fingers;
- a carriage transport which moves the carriage along orthogonal X and Y axes while holding the item to be embossed to position the item for embossing of characters;
- a pair of rams which are movable from a first withdrawn position to a second extended position which activates pairs of male-female dies to contact the item to emboss a character;
- a drive, coupled to the pair of rams, for driving the pair of rams between the first withdrawn position and the second extended position to cause individual characters to be embossed at the embossing position; and
- a controller for controlling the wheel positioning mechanism, the carriage, carriage transport and the motor drive.

66. An embosser in accordance with claim 65 wherein the drive comprises:
- a first pair of pivotable links which pivot about a pivot axis which respectively pivot between a withdrawn position and an extended position which drive the rams between the first withdrawn position and second extended position and a motor, coupled to the first pair of pivotable links, for driving the first pair of pivotable links between the withdrawn and extended positions.

67. An embosser in accordance with claim 66 wherein the drive further comprises:
- a second pair of pivotable links, one of the second pair of links being pivotably attached to one of the first pair of pivotable links and another of the second pair of pivotable links being attached to another of the first pair of pivotable links, the second pair of pivotable links also being pivotably attached together at a drive point; and
- an assembly, coupled to the drive point and to the motor, for reciprocating the drive point between first and second positions which cause the corresponding movement of attachment points of the first and second pairs of links between first and second positions which causes the pair of rams to move between the first withdrawn position and the second extended position.

68. An embosser in accordance with claim 67 wherein the assembly further comprises:
- a crank driven by the motor including an eccentric point which moves eccentrically relative to an axis of rotation of the motor to which the drive point is coupled with rotation of a shaft of the motor causing the drive point to reciprocate.

69. An embosser in accordance with claim 68 wherein:
the pairs of wheels are molded from plastic.

70. An embosser in accordance with claim 67 further comprising:
- a plurality of male dies and corresponding flat surfaces mounted at the outer radial ends of the fingers for indent imprinting characters into one side of the item with a marking ribbon located between the male die and one surface of the item when the male die contacts the marking ribbon;
- an assembly carrying the marking ribbon which is pivotably mounted relative to the dies and the flat surface to swing between a withdrawn position at which embossing of the item with the male and female dies is performed and a deployed position which positions the marking ribbon between the male die and the surface of the item into which indent imprinting is performed; and the controller controls swinging of the assembly carrying the marking ribbon between the withdrawn position and the deployed position.

71. An embosser in accordance with claim 70 wherein:

the male dies and flat surfaces are metallic and are removably attached to the outer radial end of a plurality of fingers of each of the pair of wheels.

72. An embosser in accordance with claim 67 wherein:

the pairs of wheels are molded from plastic.

73. An embosser in accordance with claim 66 further comprising:

a plurality of male dies and corresponding flat surfaces mounted at the outer radial ends of the fingers for indent imprinting characters into one side of the item with a marking ribbon located between the male die and one surface of the item when the male die contacts the marking ribbon;

an assembly carrying the marking ribbon which is pivotably mounted relative to the dies and the flat surface to swing between a withdrawn position at which embossing of the item with the male and female dies is performed and a deployed position which positions the marking ribbon between the male die and the surface of the item into which indent imprinting is performed; and the controller controls swinging of the assembly carrying the marking ribbon between the withdrawn position and the deployed position.

74. An embosser in accordance with claim 68 further comprising:

a plurality of male dies and corresponding flat surfaces mounted at the outer radial ends of the fingers for indent imprinting characters into one side of the item with a marking ribbon located between the male die and one surface of the item when the male die contacts the marking ribbon;

an assembly carrying the marking ribbon which is pivotably mounted relative to the dies and the flat surface to swing between a withdrawn position at which embossing of the item with the male and female dies is performed and a deployed position which positions the marking ribbon between the male die and the surface of the item into which indent imprinting is performed; and the controller controls swinging of the assembly carrying the marking ribbon between the withdrawn position and the deployed position.

75. An embosser in accordance with claim 74 wherein:

the male dies and flat surfaces are metallic and are removably attached to the outer radial end of a plurality of fingers of each of the pair of wheels.

76. An embosser in accordance with claim 73 wherein:

the male dies and flat surfaces are metallic and are removably attached to the outer radial end of a plurality of fingers of each of the pair of wheels.

77. An embosser in accordance with claim 66 wherein:

the pairs of wheels are molded from plastic.

78. An embosser in accordance with claim 65 further comprising:

a plurality of male dies and corresponding flat surfaces mounted at the outer radial ends of the fingers for indent imprinting characters into one side of the item with a marking ribbon located between the male die and one surface of the item when the male die contacts the marking ribbon;

an assembly carrying the marking ribbon which is pivotably mounted relative to the dies and the flat surface to swing between a withdrawn position at which embossing of the item with the male and female dies is performed and a deployed position which positions the marking ribbon between the male die and the surface of the item into which indent imprinting is performed; and the controller controls swinging of the assembly carrying the marking ribbon between the withdrawn position and the deployed position.

79. An embosser in accordance with claim 78 wherein:

the male dies and flat surfaces are metallic and are removably attached to the outer radial end of a plurality of fingers of each of the pair of wheels.

80. An embosser in accordance with claim 65 wherein:

the pairs of wheels are molded from plastic.

81. A method of processing an item in a system including a plurality of stations including an embossing station, a carriage for holding the item to be processed by the system at the plurality of stations including the embossing station, a carriage transport which moves the carriage while holding the item to be processed, and at least one station disposed on each of a plurality of spaced apart transport paths at which processing of the item is performed comprising:

holding the item to be embossed with the carriage;

for at least one of the plurality of transport paths moving the carriage holding the item to position the item held by the carriage at least one of the plurality of stations at which processing of the item is performed and from the location of the at least one station after processing is performed to another station at which processing of the item is performed with a direction of motion along the at least one transport path to the at least one of the plurality of stations being opposite to a direction of motion along the at least one transport path from the at least one station; and at each of the stations performing processing of the item including embossing the item at one of the stations.

82. A method in accordance with claim 81 wherein the plurality of spaced apart transport paths comprise:

at least two horizontal transport paths and at least one vertical transport path connected to at least one of the at least two horizontal transport paths; and wherein all of the stations are located on the at least two horizontal transport paths.

83. A method in accordance with claim 82 wherein:

all of the at least one vertical transport path is connected to at least one of the at least two horizontal transport paths at a single location therein.

84. A method in accordance with claim 83 wherein:

the connection is between a pair of stations located on one of the at least two horizontal paths.

85. A method in accordance with claim 84 wherein:

the at least two horizontal transport paths are parallel to a longitudinal axis of a housing containing the embossing system.

86. A method in accordance with claim 85 wherein:

the transport paths are located in a vertical plane; and the embossing station comprises a pair of embossing wheels having a horizontal axis of rotation and a plane between the wheels in which the item is embossed being disposed in the vertical plane.

87. A method in accordance with claim 84 wherein:

the transport paths are located in a vertical plane; and the embossing station comprises a pair of embossing wheels having a horizontal axis of rotation and a plane between the wheels in which the item is embossed being disposed in the vertical plane.

88. A method in accordance with claim 83 wherein:

the at least two horizontal transport paths are parallel to a longitudinal axis of a housing containing the embossing system.

89. A method in accordance with claim 88 wherein:

the transport paths are located in a vertical plane; and the embossing station comprises a pair of embossing wheels having a horizontal axis of rotation and a plane between the wheels in which the item is embossed being disposed in the vertical plane.

90. A method in accordance with claim 83 wherein:

the transport paths are located in a vertical plane; and the embossing station comprises a pair of embossing wheels having a horizontal axis of rotation and a plane between the wheels in which the item is embossed being disposed in the vertical plane.

91. A method in accordance with claim 82 wherein:

the at least two horizontal transport paths are parallel to a longitudinal axis of a housing containing the embossing system.

92. A method in accordance with claim 91 wherein:

the transport paths are located in a vertical plane; and the embossing station comprises a pair of embossing wheels having a horizontal axis of rotation and a plane between the wheels in which the item is embossed being disposed in the vertical plane.

93. A method in accordance with claim 82 wherein:

the transport paths are located in a vertical plane; and the embossing station comprises a pair of embossing wheels having a horizontal axis of rotation and a plane between the wheels in which the item is embossed being disposed in the vertical plane.

94. A method in accordance with claim 81 wherein:

the at least two horizontal transport paths are parallel to a longitudinal axis of a housing containing the embossing system.

95. A method in accordance with claim 94 wherein:

the transport paths are located in a vertical plane; and the embossing station comprises a pair of embossing wheels having a horizontal axis of rotation and a plane between the wheels in which the item is embossed being disposed in the vertical plane.

96. A method in accordance with claim 81 wherein:

the transport paths are located in a vertical plane; and the embossing station comprises a pair of embossing wheels having a horizontal axis of rotation and a plane between the wheels in which the item is embossed being disposed in the vertical plane.

97. A system comprising:

a plurality of stations at which processing of an item is performed including an embossing station;

a carriage for holding an item to be processed by the system at the plurality of stations including the embossing station;

a carriage transport which moves the carriage while holding the item to be processed along a plurality of spaced apart horizontal transport paths on which processing of the item occurs which are connected by at least one vertical transport path; and wherein at least one station is disposed at a location on each of the plurality of spaced apart horizontal transport paths and for at least one of the spaced apart horizontal transport paths the carriage transport moves the carriage holding the item to at least one station located on the at least one horizontal transport path at which processing of the item is performed and from the location of the at least one station after processing is performed to another station at which processing of the item is performed and with the carriage transport moving the carriage along the at least one vertical transport path to transport the carriage between the horizontal transport paths.

98. An embossing system in accordance with claim 97 wherein:

the processing is performed at the at least one station such that a direction of motion along the at least one transport path to at least one station is opposite to a direction of motion along the at least one transport path from the at least one station.

99. A method of processing an item in a system including a plurality of stations at which processing of the item is performed including an embossing station, a carriage for holding an item to be processed by the system at the plurality of stations including the embossing station, a carriage transport which moves the carriage while holding the item to be processed, with at least one station being disposed at a location on a plurality of spaced apart horizontal transport paths on which processing of the item is performed which are connected by at least one vertical transport path comprising:

holding the item to be embossed with the carriage;

for at least one of the plurality of horizontal transport paths moving the carriage holding the item to position the item held by the carriage at least one station at which processing of the item is performed and from the location of the at least one station after processing of the item is performed to another station at which processing of the item is performed; and the carriage transport moves the carriage along the vertical transport path to transport the carriage between the horizontal transport paths.

100. A method in accordance with claim 99 wherein:

the processing is performed at the at least one station such that a direction of motion along the at least one transport path to at least one station is opposite to a direction of motion along the at least one transport path from the at least one station.

* * * * *